(12) United States Patent
Cebula et al.

(10) Patent No.: US 7,334,219 B2
(45) Date of Patent: Feb. 19, 2008

(54) METHOD AND SYSTEM FOR OBJECT LEVEL SOFTWARE TESTING

(75) Inventors: James David Cebula, Conklin, NY (US); Raymond A. Gee, Windsor, NY (US)

(73) Assignee: ENSCO, Inc., Falls Church, VA (US)

( * ) Notice: Subject to any disclaimer, the term of this patent is extended or adjusted under 35 U.S.C. 154(b) by 568 days.

(21) Appl. No.: 10/674,064

(22) Filed: Sep. 30, 2003

(65) Prior Publication Data

US 2004/0153830 A1   Aug. 5, 2004

Related U.S. Application Data

(60) Provisional application No. 60/414,325, filed on Sep. 30, 2002.

(51) Int. Cl.
  *G06F 9/45* (2006.01)
(52) U.S. Cl. .................... 717/124; 714/38
(58) Field of Classification Search ........... 717/124; 714/38
  See application file for complete search history.

(56) References Cited

U.S. PATENT DOCUMENTS

| | | | |
|---|---|---|---|
| 5,359,546 A * | 10/1994 | Hayes et al. ............... 702/123 |
| 5,541,863 A | 7/1996 | Magor et al. |
| 5,615,333 A * | 3/1997 | Juettner et al. ............ 714/38 |
| 5,651,111 A | 7/1997 | McKeeman et al. |
| 5,754,860 A | 5/1998 | McKeeman et al. |
| 5,781,720 A * | 7/1998 | Parker et al. ............... 714/38 |
| 5,790,117 A | 8/1998 | Halviatti et al. |
| 5,799,266 A * | 8/1998 | Hayes ......................... 702/123 |
| 6,067,639 A | 5/2000 | Rodrigues et al. |
| 6,071,316 A | 6/2000 | Grossen et al. |
| 6,202,199 B1 * | 3/2001 | Wygodny et al. .......... 717/125 |
| 6,301,701 B1 | 10/2001 | Walker et al. |
| 6,311,327 B1 | 10/2001 | O'Brien et al. |
| 6,332,211 B1 | 12/2001 | Pavela |
| 6,353,896 B1 | 3/2002 | Holzmann et al. |
| 6,370,681 B1 | 4/2002 | Dellarocas et al. |
| 6,662,312 B1 * | 12/2003 | Keller et al. ............... 714/38 |
| 6,769,114 B2 * | 7/2004 | Leung ......................... 717/124 |
| 7,062,753 B1 * | 6/2006 | Ward et al. ................. 717/124 |
| 2002/0038401 A1 | 3/2002 | Zaldi et al. |
| 2003/0023856 A1 * | 1/2003 | Horne et al. ................ 713/187 |
| 2004/0010735 A1 * | 1/2004 | Paternostro et al. ........ 714/38 |
| 2004/0031015 A1 * | 2/2004 | Ben-Romdhane et al. .. 717/107 |
| 2004/0060044 A1 * | 3/2004 | Das et al. .................... 717/171 |

* cited by examiner

*Primary Examiner*—John Chavis
(74) *Attorney, Agent, or Firm*—Nixon Peabody LLP; Jeffrey L. Costellia

(57) ABSTRACT

A system, method, and computer program product for software testing, including analyzing the source code under test to generate a scan file, including a map of the source code under test and a tree structure for the source code under test; generating a stub file for the source code under test based on the scan file; generating a driver test script file based on the scan file and the stub file; generating a test driver based on the driver test script file; and running the test driver on the source code under test to generate a results file for summarizing the results of the software testing.

37 Claims, 29 Drawing Sheets

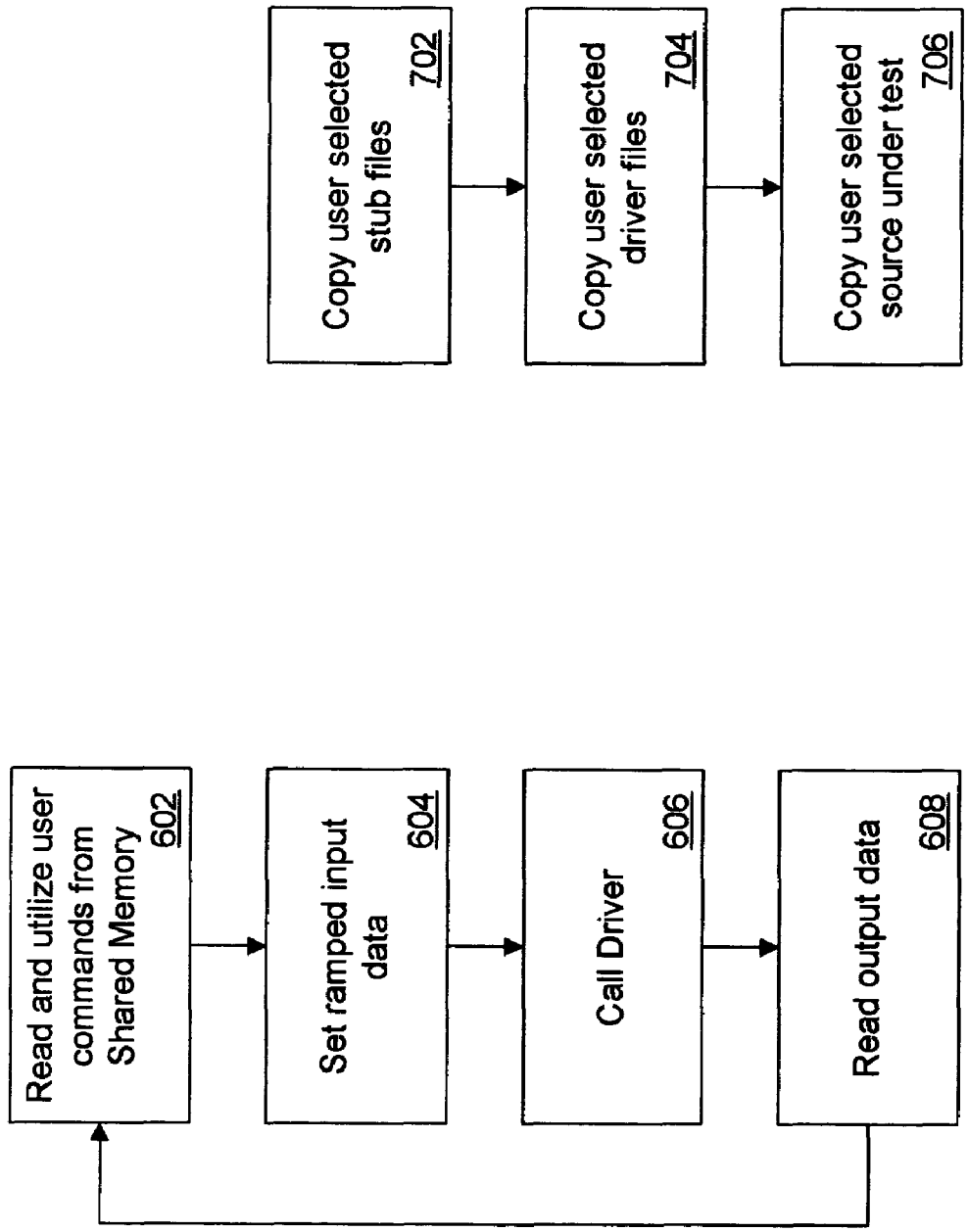

```
-------------------
-Test Suite Setup File
-------------------
-This file includes setup parameters for the test suite and can
-be placed at C:\test_suite\
- ******* Note: Do not change the working directory path ....!!! *******
-
- Specifies Which Editor to utilize
- (example: editor=notepad.exe)
- Note: If a editor does not exist, enter none
- (example: editor=none)
-
editor=notepad.exe -PDL Delimiters
- Note: If no PDL enter: none
- Example: high_level=none
- Example: low_level=none
-
high_level=%%
low_level=%

-Specify Directories
-
cm_source_dir=C:\test_suite\cm_source\
ts_output_dir=C:\test_suite\ts_output\
build_dir=C:\test_suite\build\
working_dir=C:\test_suite\
temp_dir=C:\test_suite\temp\

-Ada Parameters
- Note: ada_versions = ada83 or ada95
-
ada_version=ada95
ada_spec_suffix=.ads
ada_body_suffix=.adb
ada_separate_suffix=.a
ada_compiler=adagide.exe
- Note: If a ada compiler does not exist, enter none
- (example: ada_compiler=none)
-
-C Parameters
-
c_suffix=.c
c_header_suffix=.h
c_compiler=none
- Note: If a c compiler does not esist, enter none
- (example: c_compiler=none)
-
-Fortran Parameters
-
fortran_suffix=.f
fortran_compiler=none
- Note: If a fortran compiler does not exist, enter none
- (example: fortran_compiler=none)
-
-Options *** Note: DO NOT MODIFY ***
date_stamp=0
source_code_rev=0
test_comments=1
spec_refs=1
auto_seq=1
```

```
SOURCE_UNDER_TEST=radar_altimeter.adb
SOURCE_VERSION=
    SCCS INFO: @(#) radar_altimeter.adb 1.26  01/09/18
10:47:03
PACKAGE=Radar_Altimeter
   START_VECTOR_DATA
     OUTPUT_VARIABLE_F=Analog_Input.Lt_Antenna_Volts
     EXPECTED_VALUE=0.0
     TOLERANCE_P=0.0
   END_VECTOR_DATA
PROCEDURE/FUNCTION=Update
START_TEST=1
   START_COMMENT
     update - Ramp antenna voltage up to 6 volts.  Compute
         the radar altitude, Rate of climb and terrain
         slope for each iteration. Radar altitude will increase on
         each iteration and the ROC will remain constant.
   END_COMMENT
   START_REQUIREMENT
     The Radar Altimeter processing will select the appropriate transmit and
     receive antenna pair based on the aircraft attitude to provide radar
     altimeter operation over the required attitude range. Radar Altimeter
     processing shall provide continuous coverage below 5,000 feet AGL.
     [SRS-459]
   END_REQUIREMENT
   NUM_ITERATIONS=1
   START_ITER=1
     START_INPUT_CODE
       with Common_Types;
       Volts : Common_Types.Float_32_Type;
       with Navigation;
       Navigation.Inertial_Velocity(Navigation.North) := 500.0;
       Navigation.Inertial_Velocity(Navigation.Down) := 26.0;
       Volts := 8.0;
       with Analog_Input;
       Analog_Input.Put_Antenna_Volts(Analog_Input.Lt_Ant, Volts);
       Analog_Input.Put_Antenna_Volts(Analog_Input.Rt_Ant, Volts);
       Analog_Input.Put_Antenna_Volts(Analog_Input.Ctr_Ant, Volts);
       with Antenna;
       Antenna.Update;
       Navigation.Roll_Angle.Value := 45.0;
       Navigation.Roll_Angle.Valid := True;
       with Attitude_Alt;
       Attitude_Alt.Roll_Angle.Value := 0.0;
       Attitude_Alt.Roll_Angle.Valid := False;
     END_INPUT_CODE
     START_OUTPUT_CODE
       with Common_Types;
       Radar_Altitude : Common_Types.Validity_Tested_Type;
       with Radar_Altimeter;
       Radar_Altitude := Radar_Altimeter.Get_Radar_Altitude;
     END_OUTPUT_CODE
     START_EXPECTED_RESULTS
       OUTPUT_VARIABLE_F=Radar_Altitude.Value
       EXPECTED_VALUE=120.25
       TOLERANCE_R=0.0
     END_EXPECTED_RESULTS
     START_EXPECTED_RESULTS
       OUTPUT_VARIABLE_B=Radar_Altitude.Valid
       EXPECTED_VALUE=TRUE
       TOLERANCE_P=N/A
     END_EXPECTED_RESULTS
   END_ITER=1
END_TEST=1
END_TEST_FILE
```

FIG. 13

```
Created On: 07/16/2002 13:53:00
** SCCS INFO: @(#) radar_altimeter.adb 1.26 01/09/18 10:47:03

**Requirement Comments:
** The Radar Altimeter processing will select the appropriate transmit and
** receive antenna pair based on the aircraft attitude to provide radar
** altimeter operation over the required attitude range.  Radar Altimeter
** processing shall provide continuous coverage below 5,000 feet AGL.
** [SRS-459]
**Test Description Comments:
** update - Ramp antenna voltage up to 6 volts.  Compute
** the radar altitude, Rate of climb and terrain
** slope for each iteration.  Radar altitude will increase on
** each iteration and the ROC will remain constant.
**Package Name:  Radar_Altimeter
**Procedure Name: Update
**Test Case Number:     1

Variable Name          Actual Value       Expected Value     Tolerance
Results

Radar_Altitude.Value   1.20250E+02        1.20250E+02    (+/-) 0.00000E+00
PASS
Radar_Altitude.Valid   TRUE               TRUE               N/A          PASS Vector Data Results
_____

Analog_Input.Lt_Antenna_Volts
            8.00000E+00         0.00000E+00    (%) 0.00000E+00         FAIL SUMMARY For: radar_altimeter_drv
_____

Number Passed:    2
Number Failed:    1
Total:     3
                                                                        1400
```

FIG. 14

```
Source File: analog_input.adb
package body Analog_Input is
  procedure Put_Antenna_Volts
         (Which_One : in Antenna_Type;
          Volts : in Common_Types.Float_32_Type) is
    case Which_One is
      when Lt_Ant =>
      when Rt_Ant =>
      when Ctr_Ant =>
      when others =>
    function Get_Left_Ant
      return Common_Types.Float_32_Type is
    function Get_Right_Ant
      return Common_Types.Float_32_Type is
    function Get_Ctr_Ant
      return Common_Types.Float_32_Type is
end Analog_Input;

Number of Packages   = 1
Number of Procedures = 1
Number of Functions  = 3
Lines of PDL         = 0
Lines of Code (LOC)  = 15
```

METHOD AND SYSTEM FOR OBJECT LEVEL SOFTWARE TESTING

CROSS REFERENCE TO RELATED DOCUMENTS

The present invention claims benefit of priority to commonly assigned, now abandoned, U.S. Provisional Patent Application Ser. No. 60/414,325 of Gee et al., entitled "OBJECT LEVEL SOFTWARE TEST SUITE," filed Sep. 30, 2002, the entire disclosure of which is hereby incorporated by reference herein.

BACKGROUND OF THE INVENTION

1. Field of the Invention

The present invention generally relates to methods and systems for testing software, and more particularly to a method and system for testing software at the object level.

2. Discussion of the Background

Customers that develop and maintain software prime source code (e.g., avionics source code, etc.) are in need of object level and unit testing for newly developed code. Such object level and unit testing typically is performed by a multitude of methodologies that vary from project to project. In addition, very few standards and guidelines are shared among software test engineers. Typically, each computer component grouping is tested vastly different from the next, even within a common project. Furthermore, such testing typically is based upon the particular preferences of the individual software testing engineers, resulting in various problems, and inefficiencies.

SUMMARY OF THE INVENTION

Therefore, there is a need for a method and system for software testing that addresses the above and problems with software testing methodologies. The above and other needs are addressed by the exemplary embodiments of the present invention, which provide an exemplary system and method for software testing. The exemplary embodiments include novel automated processes in the form of a software testing tool suite for performing code analysis, for providing variable and variable type definition, for providing driver creation, for providing stub generation, and the like. Advantageously, the exemplary system and method for software testing can provide a novel platform for standardized test procedure development, for example, including repeatable test cases to prove software verification, a consistent and standard look and feel for test procedures, results file, and test case documentation, and a re-usable test procedure for subsequent regression efforts.

Accordingly, in aspects of the present invention, a system, method, and computer program product for software testing are provided. The system, method, and computer program product include analyzing the source code under test to generate a scan file, including a map of the source code under test and a tree structure for the source code under test; generating a stubbed file based on external calls of procedures/functions within the source code under test; generating a driver test script file based on the scan file and the stub file; generating a test driver based on the driver test script file; and running the test driver on the source code under test to generate a results file for summarizing the results of the software testing.

Still other aspects, features, and advantages of the present invention are readily apparent from the following detailed description, simply by illustrating a number of exemplary embodiments and implementations, including the best mode contemplated for carrying out the present invention. The present invention also is capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The embodiments of the present invention are illustrated by way of example, and not by way of limitation, in the figures of the accompanying drawings and in which like reference numerals refer to similar elements and in which:

FIGS. 6-11 illustrate processes for software testing that can be performed by the exemplary embodiments of FIGS. 1-5;

FIGS. 12-14 illustrate a test setup file, a driver script file, and a results file, according to exemplary embodiments;

FIGS. 15-37 illustrate screen shots of the software testing tool suite of FIGS. 1-5, according to various exemplary embodiments;

DETAILED DESCRIPTION OF THE PREFERRED EMBODIMENTS

Figure 1:
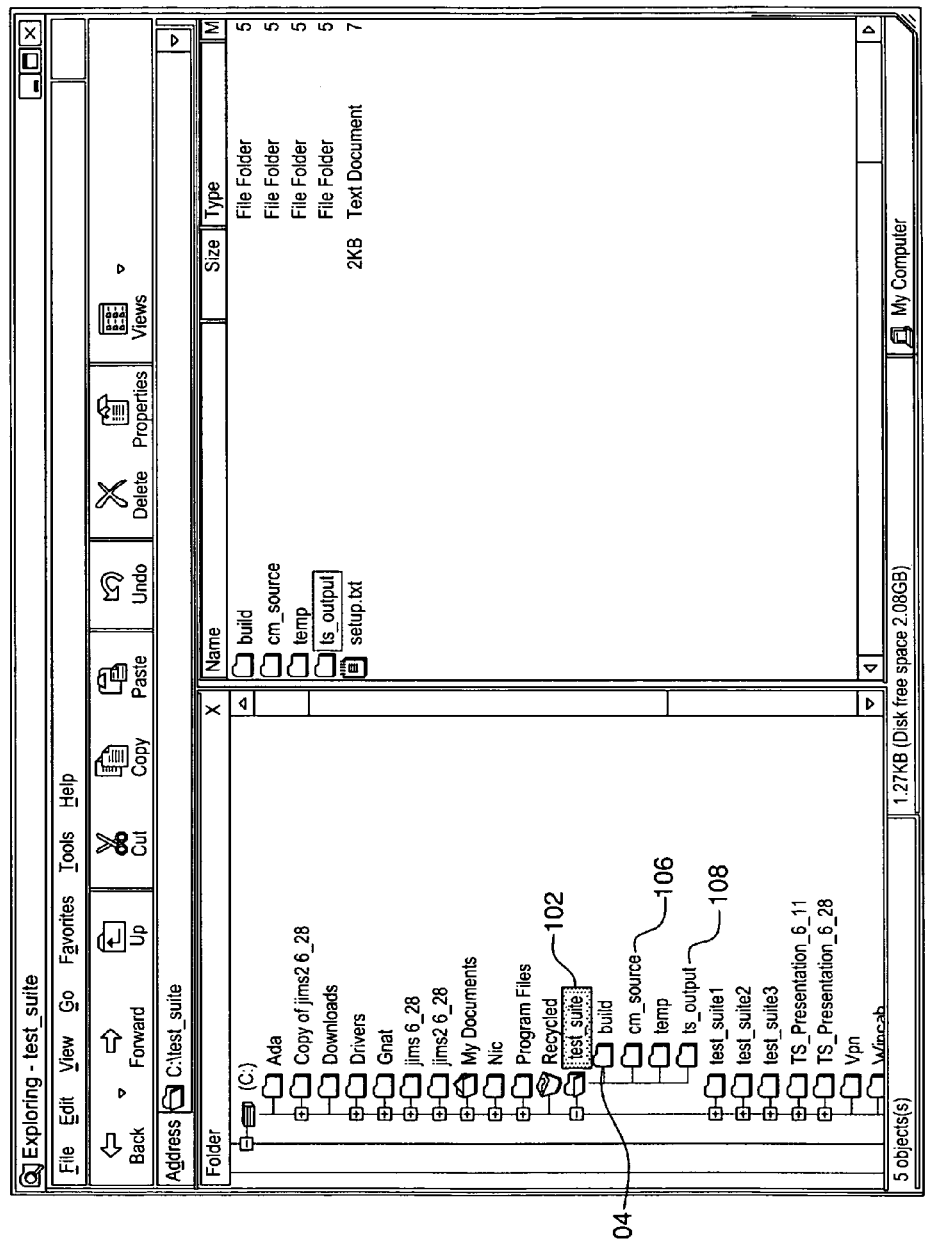
FIG. 1 illustrates test suite directories of a software testing tool suite, according to an exemplary embodiment.

The present invention includes recognition that typical software testing requires a large amount of redundant effort for performing various related tasks, such as code analysis, test driver creation, variable and variable type definition, stub generation, regression test availability, and the like. In addition, the present invention includes recognition that test development can be dependent on the style and interpretation of an individual designer or tester and that the content of resulting test procedures and test documentation can vary greatly from desired standards.

The test suite of the exemplary embodiments addresses the above and other problems by providing novel automated processes, in the form of an exemplary software testing tool suite, for performing code analysis, for example, via an exemplary code scanner, variable and variable type definition, driver creation, for example, via an exemplary driver script generator, stub generation, for example, via an exemplary stub generator, and the like. The exemplary test suite further addresses the above and other problems by providing a novel platform for standardized test procedure development, for example, including repeatable test cases to prove software verification, consistent and standard look and feel for test procedures, results file, and test case documentation, re-usable test procedure for subsequent regression efforts, and the like.

The exemplary test suite can be configured to be platform independent, for example, via an internal File Transfer Protocol (FTP) application, can provide a multi-language test capability, for example, for C, Ada, FORTRAN, and the like, can provide a mixed-language test capability, can provide an easy to use graphical user interface (GUI), can provide automation of test set-up and support activities, reducing the time of non-test related efforts, can be configured as an object oriented design, allowing for flexibility in functionality and features, can provide a user easy access to source code and data files (e.g., by double clicking on file to display contents thereof), and the like.

Advantageously, the exemplary test suite can provide improved productivity, for example, when creating new tests, performing regression testing, and the like. The exemplary test suite can be configured to provide ease of software certification (e.g., DO187 certification for avionics software), can provide testing repeatability, including consistent documentation, full featured result files, and the like. The exemplary test suite can be configured to provide stub files for an entire build being generated automatically, can automatically perform analysis of code to identify testable gates by searching for keywords, reducing time to determine coverage, and the like. The exemplary test suite can be configured to provide metrics, for example, on source lines of code (SLOC), number of page description language (PDL) lines, procedures, and functions, and the like.

The exemplary test suite can be configured to provide creation of a driver that is consistent in format, can be used to set and read signals from or to software under test, can provide input/output variables and types extracted from easily accessible source code to reduce error, save time, and the like. The exemplary test suite can be configured to provide expected and actual test results, tolerances, pass/fail status, in a consistent and repeatable format. The exemplary test suite further can facilitate entry of information for requirement traceability, software version, test descriptions, software design, and the like. The exemplary test suite can be configured to provide selection of multiple code modules to perform integration level testing, and the like.

The exemplary test suite can be employed to assist a user in, for example, complete testing of software development, software code, and the like. The exemplary test suite can be implemented, for example, as a PC-based, Windows driven application that, for example, can be configured to allow the user to select functions that can test prime software at the procedure or function level, the object or string level, the systems integration level, and the like. The user can easily select the exemplary test suite to be configured for testing source code written in, for example, Ada, C, FORTRAN, and the like. However, the exemplary test suite can be used with other operating systems and can be used to test other types of source code, as will be appreciated by those skilled in the relevant art(s).

In an exemplary embodiment, exemplary internal tool functions can be configured to handle error conditions, and the like, that may occur. For example, an integer error value can be returned to a main function, wherein a returned value of zero can be used to indicate no error, a non-zero value can be used to indicate an error, and the like. The exemplary error handler, as further described, can provide a listing for specific errors and associated error numbers. In an exemplary embodiment, a storage media, such as a CD ROM, and the like, can be created and configured to include software, documentation, install files, and the like, needed to run the exemplary object level software test suite, for example, on a Windows 95 or newer PC, and the like.

Referring now to the drawings, wherein like reference numerals designate identical or corresponding parts throughout the several views, and more particularly to FIG. 1 thereof, there are illustrated test suite (TS) directories, according to an exemplary embodiment. In FIG. 1, the exemplary test suite directories can include a test suite directory 102 that can be created by running the install executable, a build directory 104, including files employed for compiling and linking, including symbolic linking, to build an executable file used for testing, a configuration management (CM) source directory 106, including configured files, which also can include symbolic linking, a TS output (ts_output) directory 108, including files generated by the exemplary tool suite, and the like.

In an exemplary embodiment, an installation executable (e.g., called install.exe) can be created and when invoked can install files and executables employed for running the exemplary object level software test suite package. In an exemplary embodiment, during installation, a note can be displayed indicating to the user to modify the setup file for particulars of the user. A file (e.g., called readme.txt) also can be installed. In an exemplary embodiment, the default installation directory can be set to C:\test_suite\, and the like, but otherwise the default directory can be user specified.

In an exemplary embodiment, questions that can be displayed to the user, prompted to the user, and the like, when the installation executable is invoked, for example, can include:
1. Enter installation directory:
(Default directory C:\test_suite\).
2. Display README.txt File (Y/N):
3. Run test suite now (Y/N):

In an exemplary embodiment, an uninstall executable (e.g., called unistall.exe) can be created, such that when invoked can remove files and executables related to the exemplary test suite from the default directory, C:\test_suite\. In an exemplary embodiment, the default directory for uninstalling also can be user specified.

Figure 2:
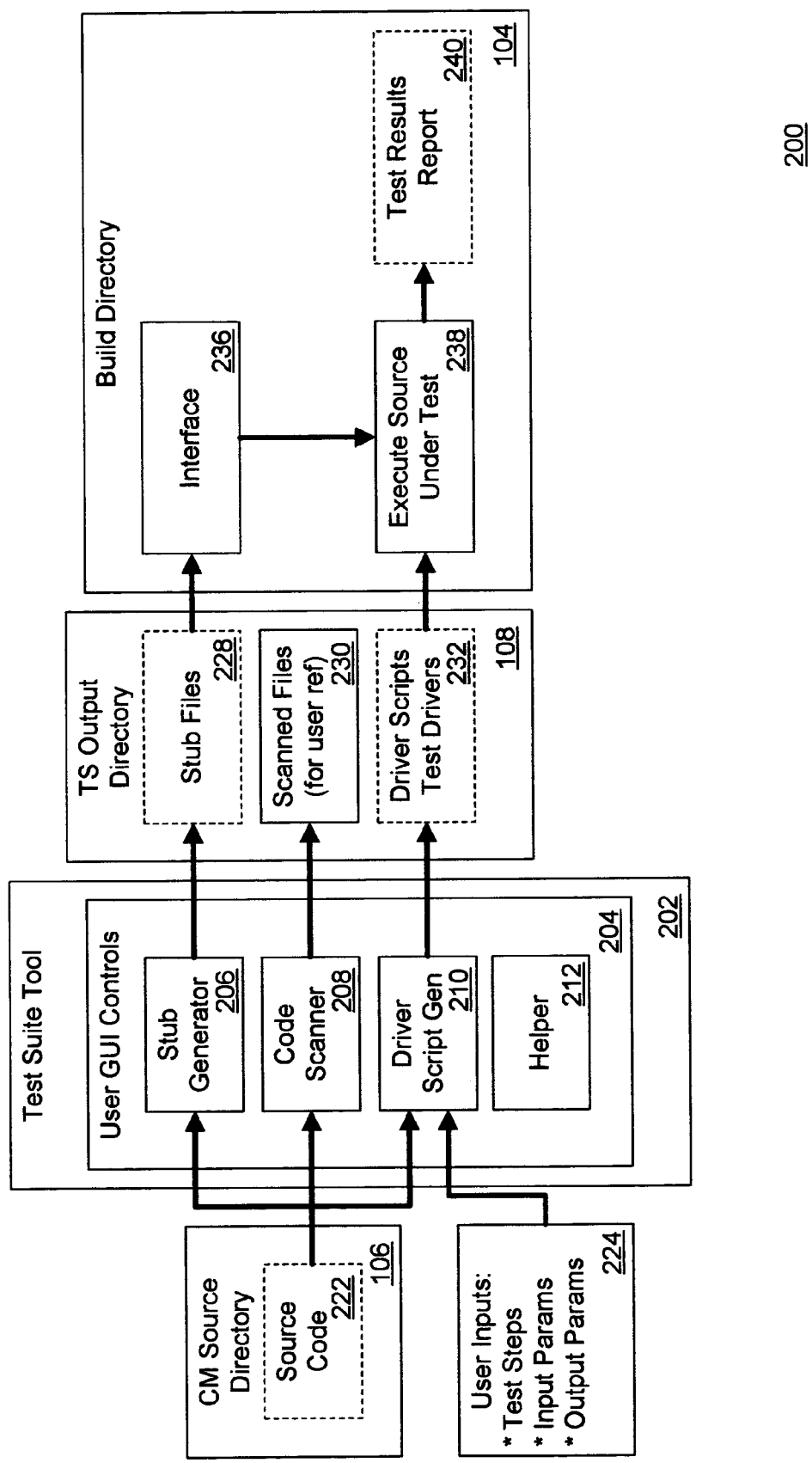
FIGS. 2-5 illustrate systems for testing object level software, according to various exemplary embodiments.

FIGS. 2-5 illustrate systems for testing object level software, according to various exemplary embodiments. In FIG. 2, graphical user interfaces (GUI) 204 can be used to bind a test suite 202 together and allow the user to easily perform the various tasks involved, for example, by use of pages, windows, and the like, of the GUI 204. In an exemplary embodiment, one or more GUIs 204 (e.g., implemented using Visual C++, Visual Basic, and the like) can be employed and can include stub generator functions 206, code scanner functions 208, driver script generator functions 210, helper functions 212, and the like. In further exemplary embodiments, in the exemplary systems 300 and 400, as shown on FIGS. 3 and 4, build directory functions 314, tool utility functions 316, such as an FTP Utility 418, and the like, also can be provided.

Figure 3:
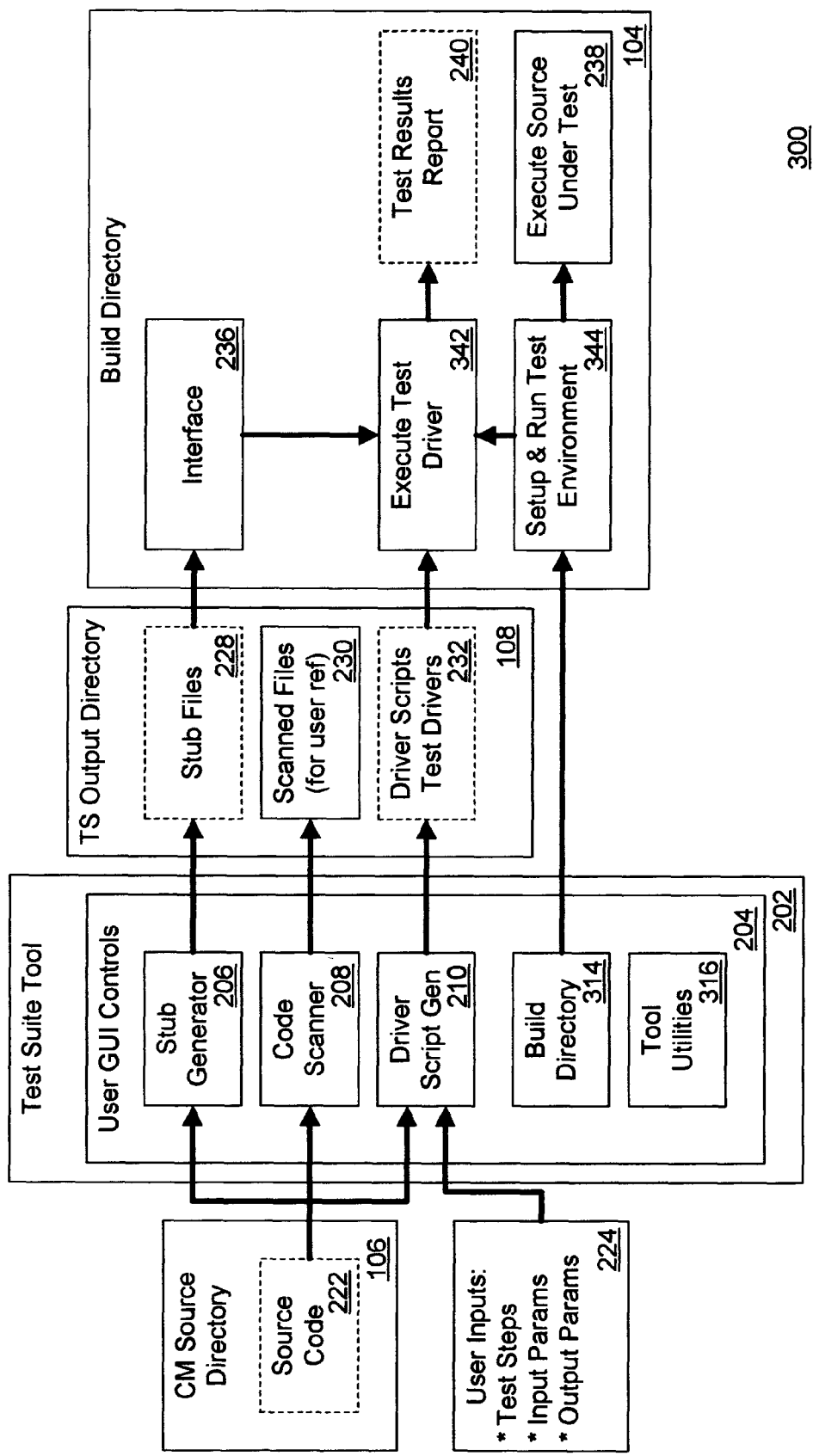
Figure 4:
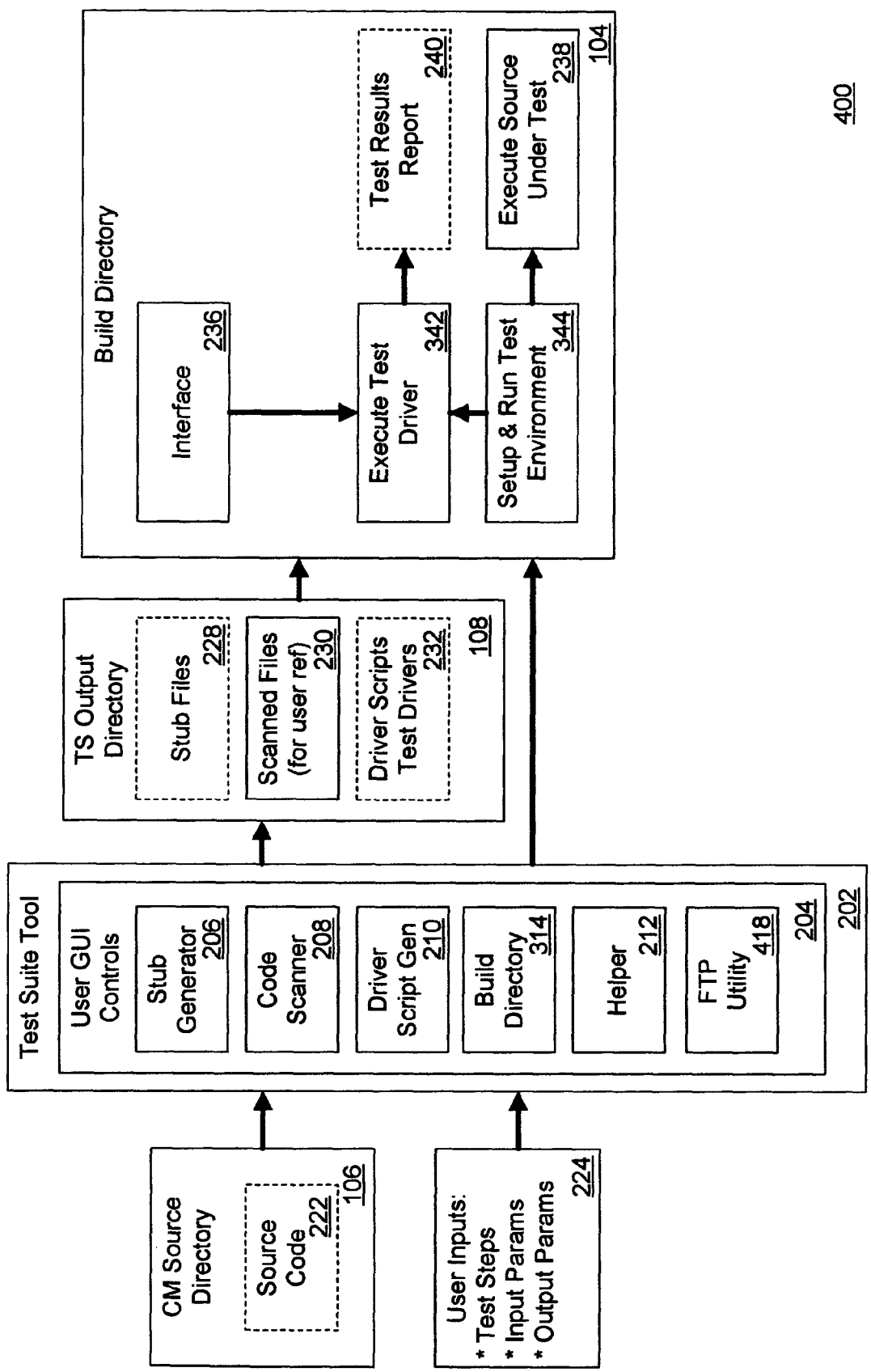

The exemplary system 200 can include the CM source directory 106, including source code 222, and user inputs 224, the TS output directory 108, including stub files 228, scanned files 230, and driver scripts 232, the software (SW) test build directory 104, including interface software 236, an execute source under test component 238, test results report 240, and the like. In further exemplary embodiments, in the exemplary systems 300 and 400, as shown on FIGS. 3 and 4, an execute test driver component 342, a setup and run test environment component 344, and the like, can be provided. In FIGS. 2-4, components shown with a dashed line can be content management controlled items.

In an exemplary embodiment, the exemplary test suite can be run as a Windows application, providing the user with a simplified approach to software testing via the exemplary GUI 204. The functional software of the exemplary test suite, for example, can be executed from the command line, for example, by executing the helper functions 212, which can be written in C, C++, and the like. Advantageously, this feature can allow the exemplary test suite to be run on non-Windows platforms, such as UNIX platforms, DOS platforms, and the like.

In an exemplary embodiment, as previously described, the directory structure can be created, for example, including the CM source directory 106, the TS output directory 108, the build directory 104, and the like, as shown in FIG. 1. The CM source directory 106 can include source code to be tested, as well as the interfacing software 236. The TS output directory 108 can include files created by the exemplary test suite, such as stubbed files, scanned files, test script files, test driver files, and the like.

Figure 5:
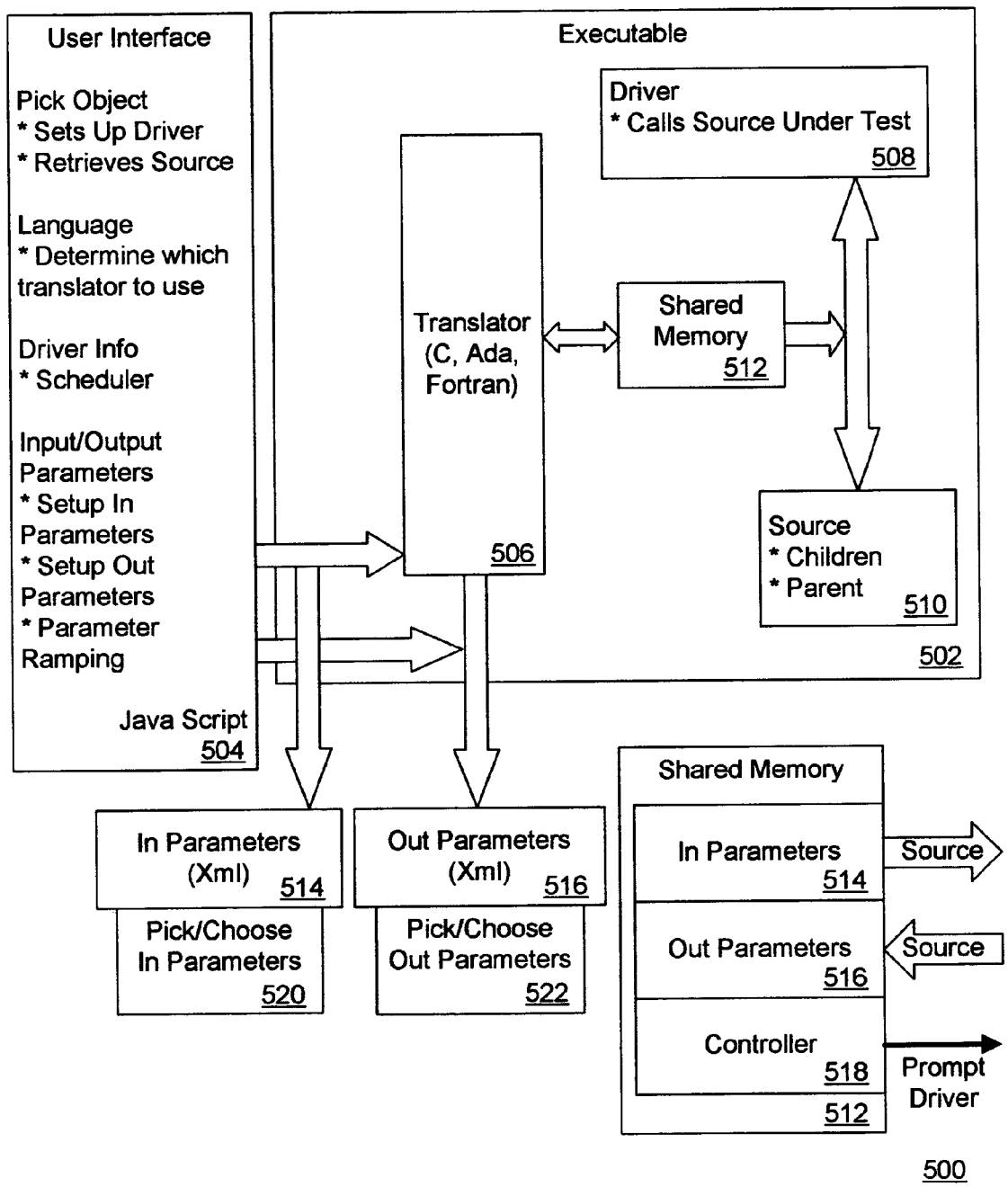

In FIG. 5, a further exemplary object level software testing system 500 can include a user interface 504, for example, implemented as a Java script, and the like, for providing the noted user interface functions, an executable component 502, including a translator component 506, a driver component 508, a source component 510, a shared memory component 512, and the like. The shared memory component 512 can further include a controller component 518, an input parameters component 514, an output parameters component 516, which can be picked, chosen, and the like, by a user, via the corresponding components 520 and 522 (e.g., implemented using eXtensible Markup Language (XML), etc.), and the like. In an exemplary embodiment, the source component 510 can include the object under test, specs, children, stubs, and the like, that are employed for complete compiling and linking.

In an exemplary embodiment, the translator 506 can be configured to receive data, via the user interface 504, and convert the received data into another format, for example, such as an XML format, and the like. The exemplary translator 506 can further be configured to take in the XML formatted data and convert such data into a language specific format for the layout of the shared memory 512 partition. The exemplary translator 506 can be configured to handle various data formats, such as integer byte, integer half word, integer word, float, character data, 1553 bit pattern, 422 bit patterns, and the like.

In an exemplary embodiment, a scheduler sub-component (not shown) can be provided and can be configured for calling the driver 508 at a rate defined by the user from the user interface component 504. The execution rate of the driver 508 can be configured for various rates of executions, such one shot execution, 50 Hz execution, and the like. The exemplary scheduler also can be configured for ramping of specified values of the input parameters 514 and/or the output parameters 516. The exemplary scheduler also can be configured to set data based on test case number, iteration count, and the like (e.g., set weight_on_wheels flag to true for iterations 1-6, set to false for iteration count 6 through to the end, etc.). The exemplary scheduler further can be configured to set data based on test case number (e.g., set weight_on_wheels flag true for test cases 1-20, set false otherwise, etc.). The exemplary scheduler can be configured to include a preset fixed number of test cases (e.g., FFF or 4095, etc).

In an exemplary embodiment, the driver 508, and the like, can be configured to call the actual source module under test. The exemplary driver 508 can be language specific, for example, based on the module under test. The exemplary driver 508 can be configured as a high level module overseeing parent and children under test. The exemplary driver 508 can be configured to be non-generic and can be based on the object under test. The exemplary driver 508 can be separated by test case numbers, which correspond to actual calls to procedure or function calls to the object under test.

Each test case can include corresponding input parameters and output parameters. The input parameters 514 can be derived from the user interface 204 or 504 and the desired outputs can be output to the results file (e.g., called ".results"). The exemplary driver 508 also can be configured to correlate the test case numbers from the scheduler to actual calls to procedure or function calls to the object under test.

In an exemplary embodiment, the test case numbers can be generated, for example, via a code scanner, such as the exemplary code scanner 208, and the like. Advantageously, the exemplary scheduler can be configured to be generic and need not be based on the module under test. The exemplary scheduler can be configured to include one or more interfaces (e.g., Pragma, etc.), for example, including an interface configured for input data parameters, and an interface configured for output data parameters. In an exemplary embodiment, such interfaces can be configured, for example, as C language data modules configured to map the data parameters to the source 510 under test, to the user interface 504, and the like.

In an exemplary embodiment, the shared memory 512 sub-component, for example, can be configured as C based routine configured to map the user interface 504 data parameters to the data parameters that the source 510 under test can utilize. The exemplary routine can be called, for example, via one or more of the above-noted interfaces (e.g., Pragma, etc.) for the case of an Ada source 510 module. The size of the shared memory 512 can be configured to be a fixed, relatively large, size. In an exemplary embodiment, information within the XML data can be configured for determining how much of the shared memory 512 can be utilized. In an exemplary embodiment, the types of data that can be included in the shared memory 512 space, for example, can include scheduler control parameters 518, input parameters 514, output parameters 516, and the like.

FIG. 6 illustrates an exemplary process that can be performed by the executable 502 of the exemplary system 500 of FIG. 5. In FIG. 6, at step 602, user commands are read and utilized by the executable 502 form the shared memory 512. At step, 604, ramped input data can be set. At step 606, the driver 508 can be called. At step 608, output data can be read and further processing of user commands can be performed by returning control to step 602.

FIG. 7 illustrates an exemplary process that can be performed based on the build directory 314 of the exemplary systems 300 and 400 of FIGS. 3 and 4. In FIG. 7, at step 702, user selected stub files can be copied. At step 704, user selected driver files can be copied. At step 706, user selected source under test files can be copied.

Figure 8:
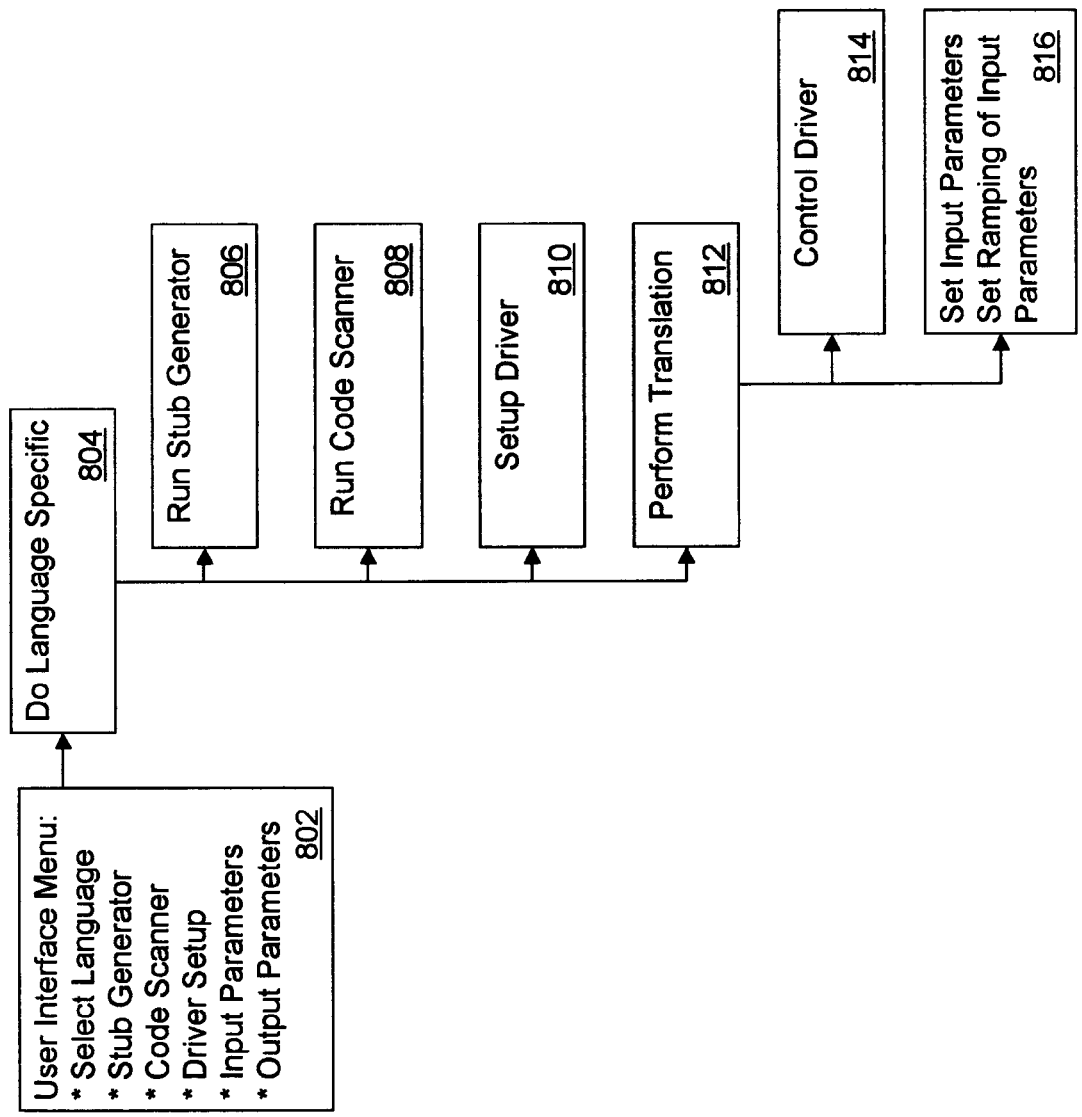

FIG. 8 illustrates exemplary user interface processes that can be performed based on the exemplary systems, 200-500 of FIGS. 2-5. In FIG. 8, at step 802, user interface menu functions can be performed. At step 804, language specific functions can be performed, including, at step 806, running of the stub generator 206, at step 808, running of the code scanner 208, at step 810, running of the driver script generator 210 to set up the driver, and at step 812, running of the translator 506 to perform source code translation. At step 814, the control driver 508 can be generated and at step 816, the input parameters 516 can be set and ramped.

Figure 9:
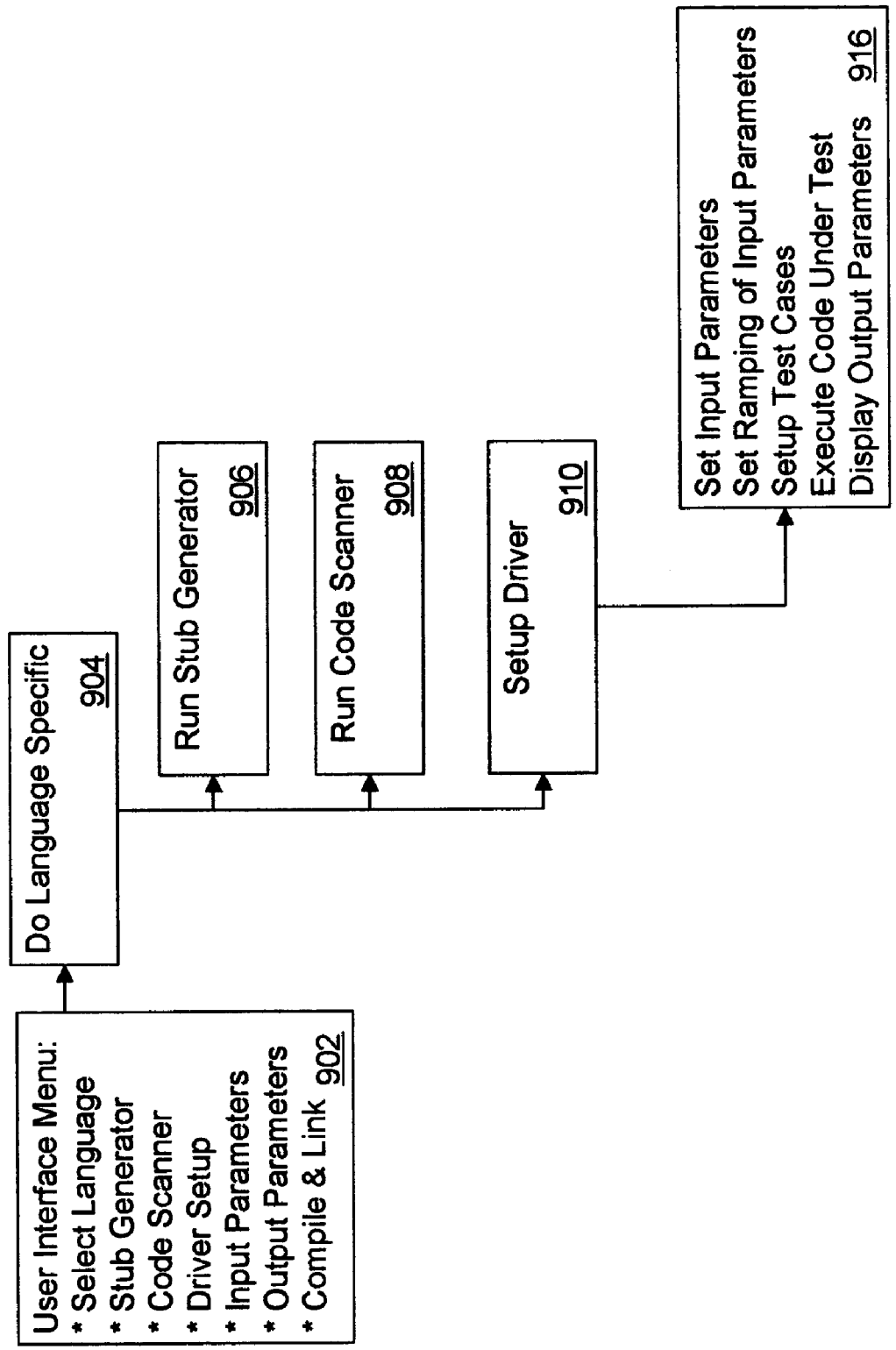

FIG. 9 illustrates further exemplary user interface processes that can be performed based on the exemplary systems 200-500 of FIGS. 2-5. In FIG. 9, at step 902, user interface menu functions can be performed. At step 904, language specific functions can be performed, including, at step 906, running of the stub generator 206, at step 908, running of the code scanner 208, and at step 910, running of the driver script generator 210 to set up the driver 508, and the like. At step 916, the input parameters 514 can be set and ramped, a test case can be set up, the code under test can be executed, and the output parameters 516 can be displayed.

Figure 10:
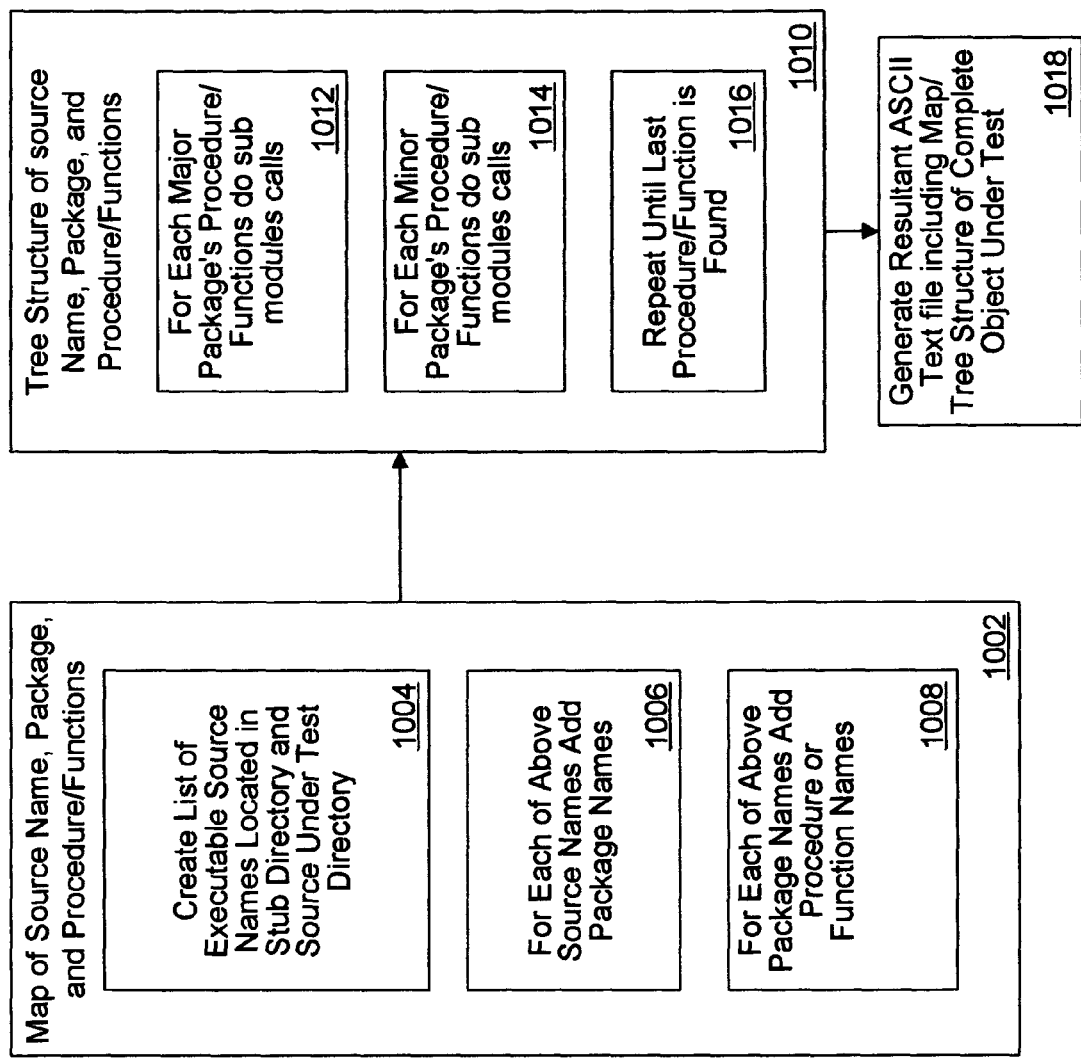

FIG. 10 illustrates exemplary code scanner processes that can be performed based on the exemplary systems, 200-500 of FIGS. 2-5. In FIG. 10, at step 1002, mapping of source name, package and procedure/functions can be performed, including, at step 1004, creating a list of executable source names located in stub and source under test directories. At step 1006, for each of the source names, package names can be added. At step 1008, for each of the package names, procedure or function names can be added, completing the process 1002 of mapping of source name, package and procedure/functions.

At step 1010, a tree structure of source name, package and procedure/functions can be generated, including, at step 1012, for each procedure/function of a major package, sub module calls can be made. At step 1014, for each procedure/function of a minor package, sub module calls can be made. At step 1016, processing is repeated until the last procedure/function can be found, completing the process 1010 of generating a tree structure of source name, package and procedure/functions. At step 1018, a resultant file, including a map/tree structure of a complete object under test can be generated. In an exemplary embodiment, the resultant file can be configured, for example, as an ASCII text file, and the like.

Figure 11:
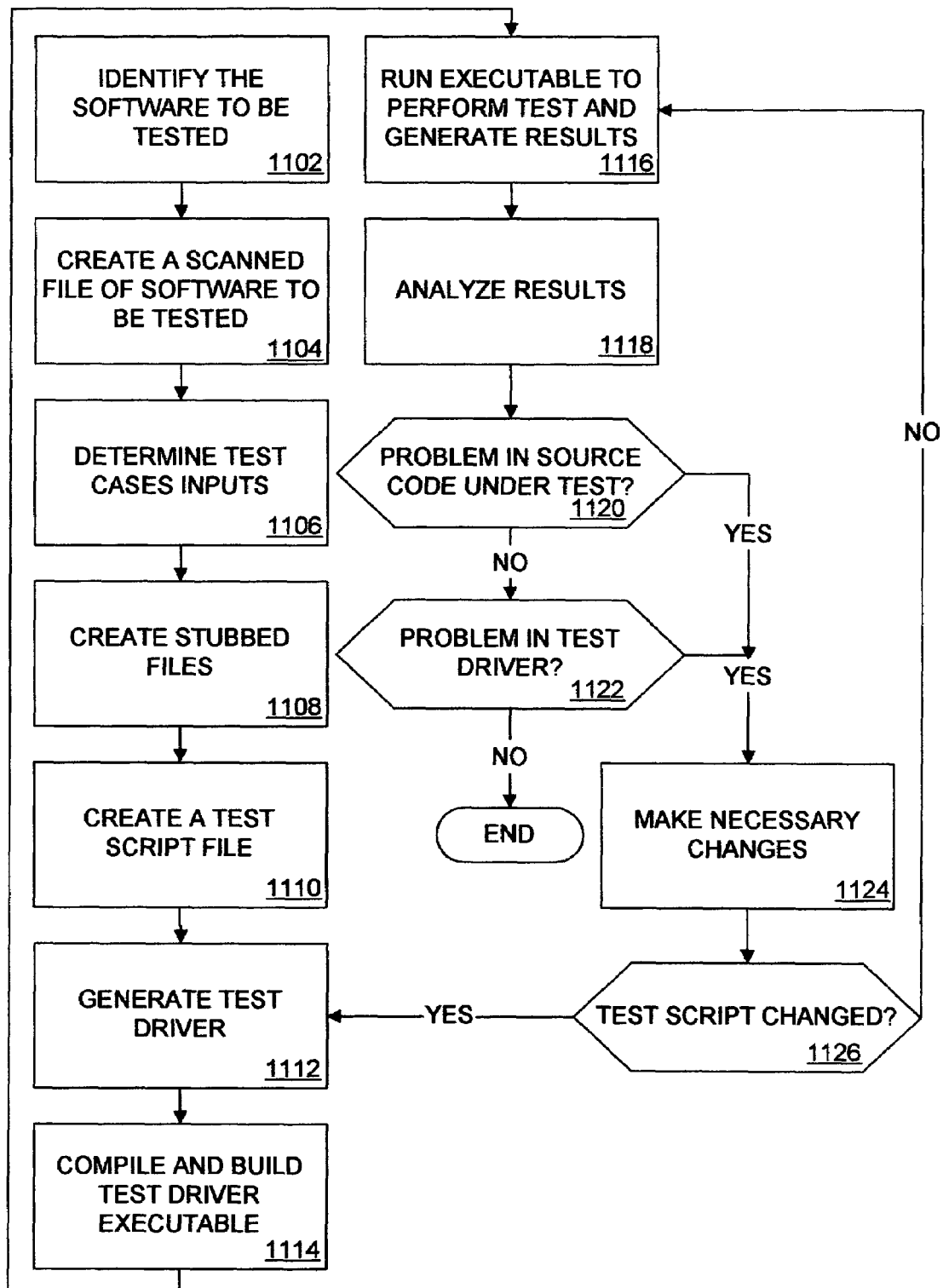

FIG. 11 illustrates an exemplary process for performing software testing in the exemplary embodiments described with respect to FIGS. 1-10. In FIG. 11, step 1102 can be used to identify the software to be tested. Step 1104 can be used to create the scanned file of the software to be tested, for example, as an aid in identifying the various input and output variables involved. Step 1106 can be used to determine the different test cases and how the inputs can be manipulated in order to test suitable conditions. Step 1108 can be used to create the employed stubbed files, for example, to eliminate interference from the interfacing software. Using the exemplary test suite, step 1110 can be used create the test script file which can be used to describe the test.

Step 1112 can be used to generate a test driver from the test script file, using the exemplary test suite. Step 1114 can be used to place copies of the test driver, stubbed files, source under test, interfacing software, and the like, in the build directory and to compile and build the test driver executable. Step 1116 can be used to run the test driver executable file to perform the test and create the results file. Step 1118 can be used to analyze the results and determine if problems exist in the source code under test or in the test driver, as can be determined by steps 1120 and 1122. Step 1124 can be used to make changes, as necessary, to the source code or the test script. If the test script is changed, as determined at step 1126, control can transfer back to step 1112 to generate a new test driver and then recompile and build the new test driver. Steps 1116 and 1118 can then be employed to rerun the test driver executable file and once again analyze the results.

The exemplary test suite can include an initialization component, a user interface component, an executable component, a stub generator component, a code scanner component, and the like. In an exemplary embodiment, during initialization, the user interface can be invoked and call a read_setup_file function that can read in a setup text file (e.g., called setup.txt). The setup file can be parsed and global variables included within the main component can be populated. The read_setup_file function can be invoked, via the main component, for example, during the initialization phase of the exemplary test suite. Global variables included within the main component then can be populated.

Once the set up is completed, the main loop can be invoked and can display a Main Menu page of the user interface. In an exemplary embodiment, the user interface 204 can be configured as the main executive that invokes the other various functions and subroutines. For example, the user interface 204 can be configured to run in a loop until the user decides to exit the exemplary test suite, for example, via a Quit button, and the like.

FIG. 12 illustrates an exemplary test setup file 1200. In FIG. 12, the exemplary text file 1200, setup.txt, can be generated automatically or manually. The file can be configured, for example, as an ASCII text file that can include initialization parameters that the exemplary object level software test suite can utilize. In an exemplary embodiment, comment lines can be prefaced with two dashes, e.g., "--". FIGS. 13 and 14 illustrate an exemplary driver script file 1300 and a driver results file 1400. In an exemplary embodiment, the driver results file 1400 can be configured to list expected results, actual results, any errors associated with differences therebetween, and the like.

Figure 15:
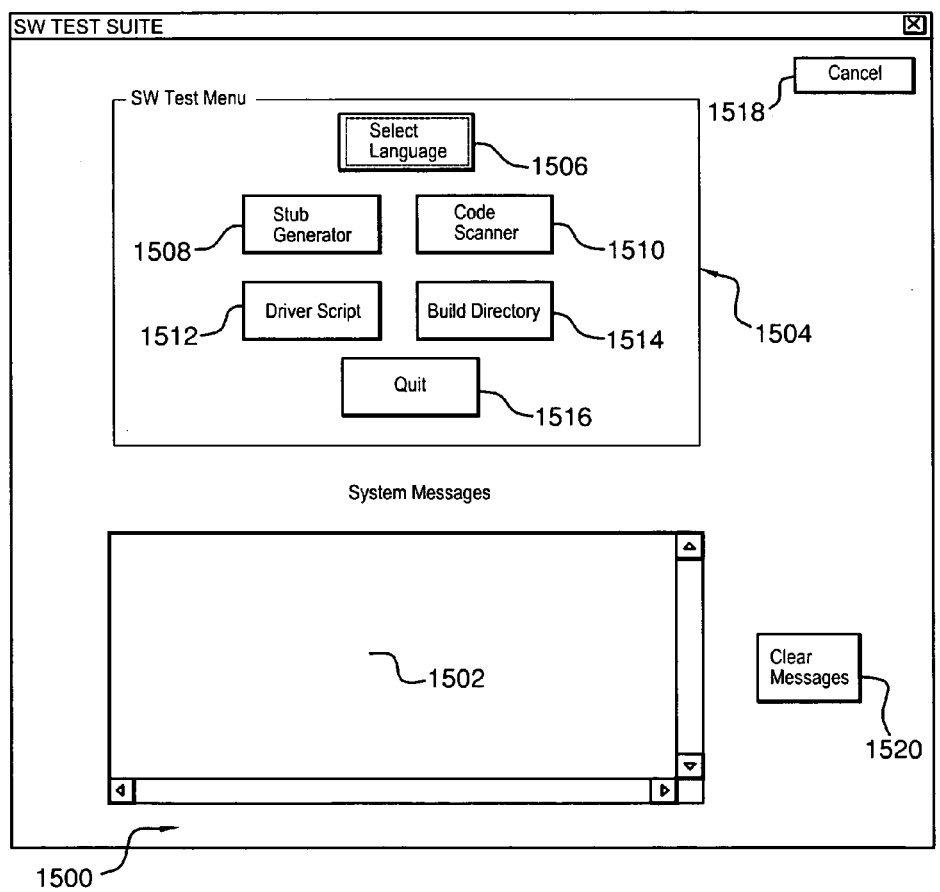
Figure 16:
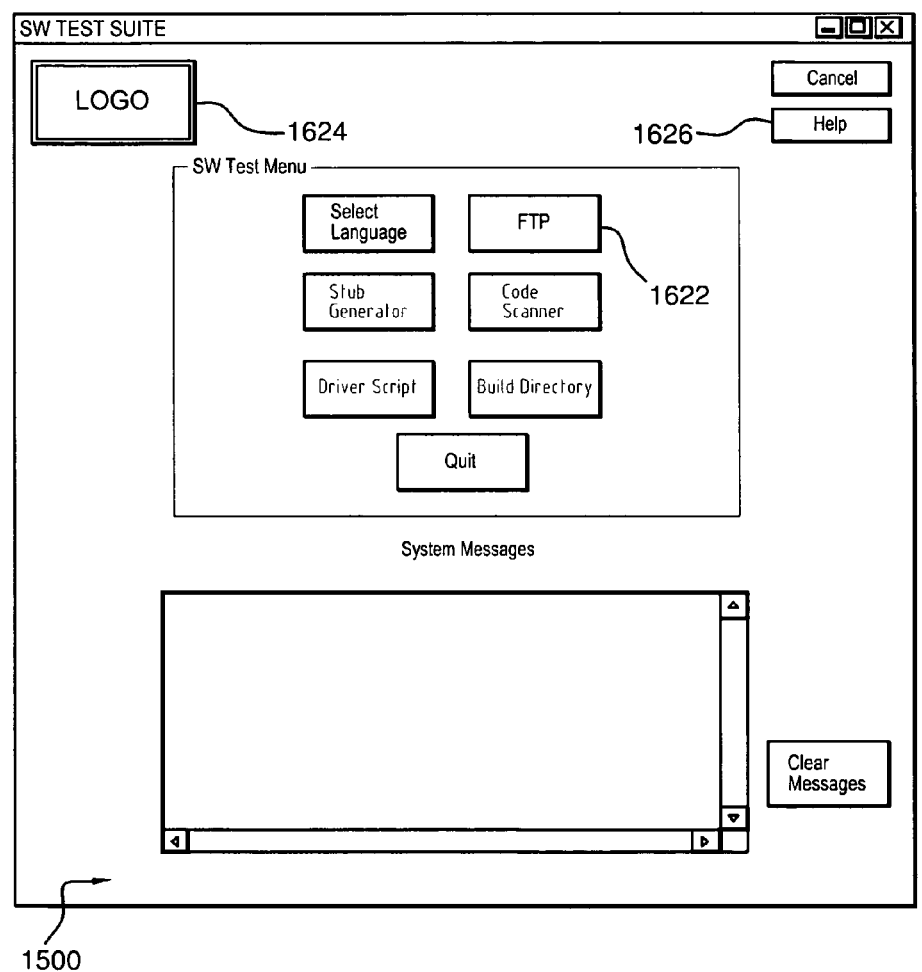
Figure 17:
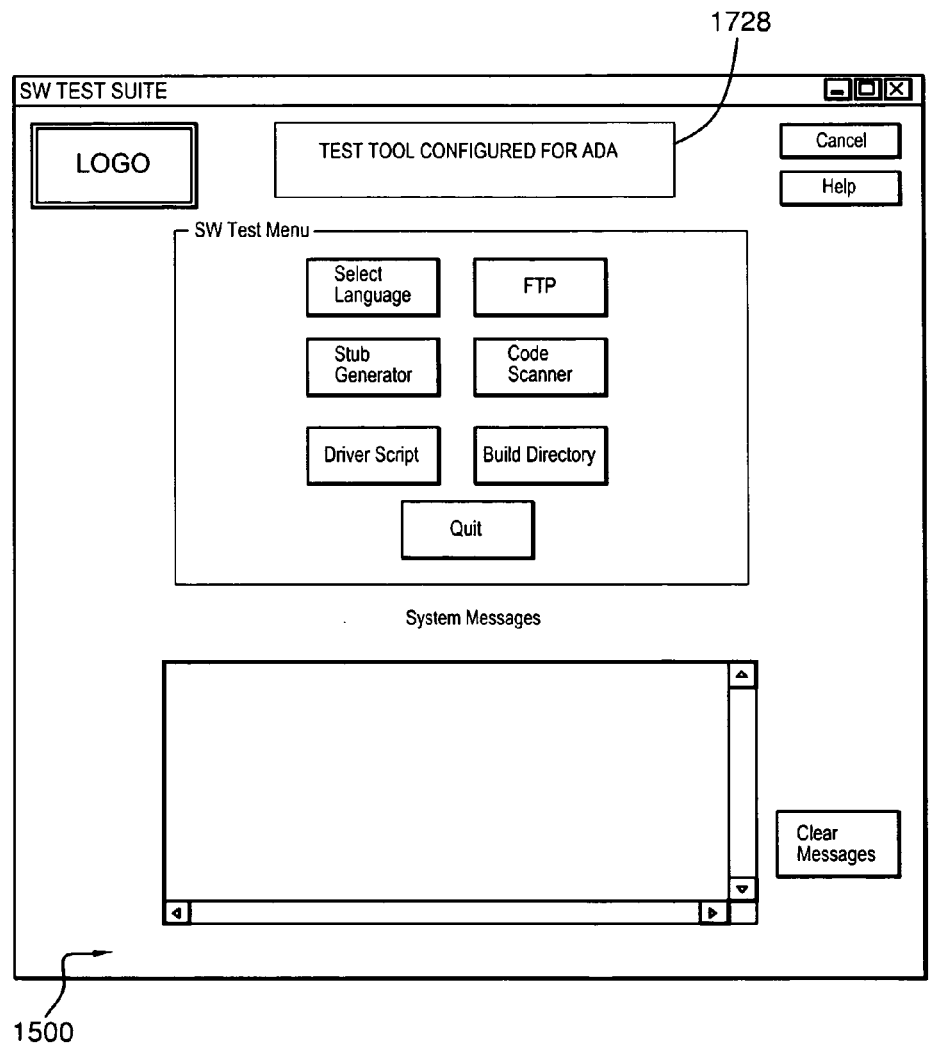

FIGS. 15-17 illustrate a SW test suite Main Menu page or window 1500, according to various exemplary embodiments. In an exemplary embodiment, the test suite Main Menu 1500 can be configured to allow a user to select a language of unit under test (UUT), FTP files across different platforms, create stubs, create listing of gates, setup test cases and drivers, compile, link and execute drivers, monitor system messages that occur during execution, and the like.

In FIGS. 15-17, the exemplary SW Test Main Menu page 1500 can include, in a SW Test Menu portion 1504, a Select Language button 1506, and an FTP button 1622, as shown in FIG. 16. The FTP button 1622 can be configured to be used to generate an FTP page or window 1800, as shown in FIG. 18.

Figure 18:
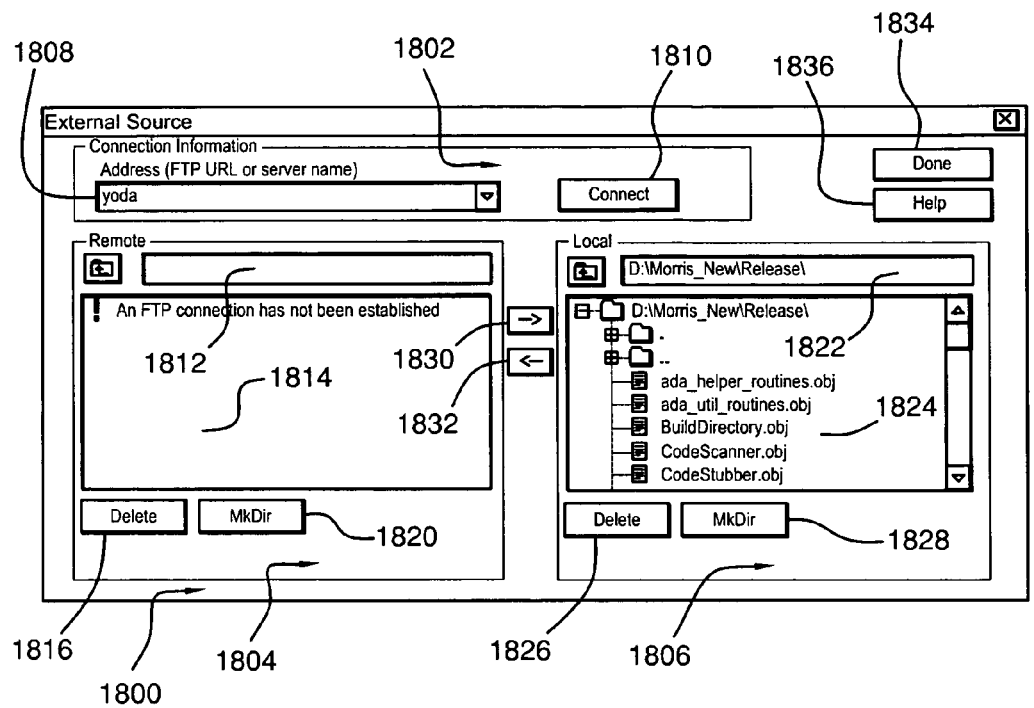

In FIG. 18, the FTP page 1800 of the FTP utility 418, allows the user to port source software from one platform to another. For example, this feature allows software residing on a UNIX based platform to be ported, copied, and the like, on to the computer executing the software test tool.

In an exemplary embodiment, once a driver is created, the driver can be run on the computer or ported back, via the built in FTP utility 418, to the UNIX platform and run there. In an exemplary embodiment, the FTP utility 418 window 1800 includes an Address drop down menu 1808 and Connect button 1810 of a Connection Information portion 1802 that allows a user to enter or recall the address of a remote machine, platform, and the like.

In an exemplary embodiment, the window 1800 can include a Remote portion 1804 that can be used to list the files located on the remote machine, platform, and the like, in the directory specified in the field 1812 in a window section 1814. The Remote portion 1804 further can include Delete and Make directory (MkDir) buttons 1816 and 1820 for performing the indicated functions.

In an exemplary embodiment, the window 1800 can include a Local portion 1806 that can be used to lists the files in a directory located on the local PC as specified in a directory address field 1822 and as displayed in a window portion 1824. The Local portion 1806 further can include Delete and Make directory (MkDir) buttons 1826 and 1828 for performing the indicated functions. The Connect button 1810 can allow a user to connect to the remote address specified in the address field 1808, a button 1830 can allow the user to copy the highlighted file from the remote machine to the local PC, and a button 1832 allows the user to copy the highlighted file from the local PC to the remote machine, platform, and the like. The FTP window 1800 can further include a Done button 1834 and a Help button 1836 for performing the indicated functions.

Figure 19:
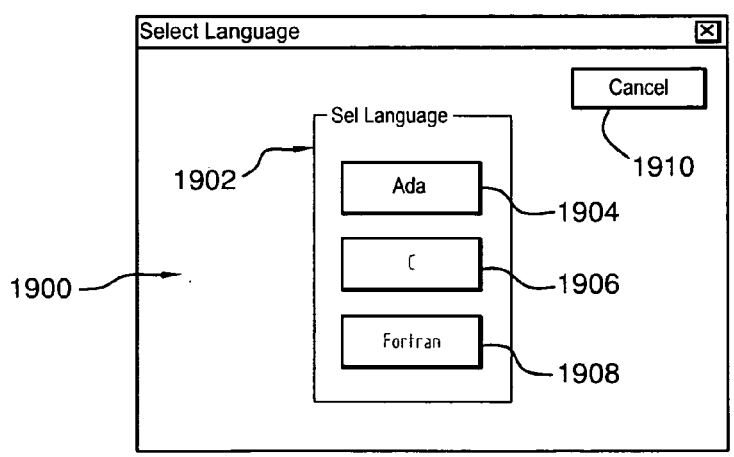

In the window 1500, the user can click on the Select Language button 1506, which can then pop up the window 1900, including software language (e.g., Ada, C, FOR-TRAN, etc.) selection buttons 1904-1908 of the window portion 1902, as shown in FIG. 19. In an exemplary embodiment, once the language is selected, the remaining buttons 1508-1516 and 1622 can be made selectable. As shown in FIGS. 15-17, the window 1500 also can include a System Messages portion 1502, including a Clear Messages button 1520, a Cancel button 1518, a Help button 1626, a logo portion 1624, and a language configuration identification portion 1728. On the main window 1500, the Select Language button 1506 can be made selectable. When the user first selects the button 1506, the Select Language page 1900 can appear.

FIG. 19 illustrates a Select Language page 1900, according to an exemplary embodiment. In FIG. 19, the exemplary window 1990 can include language buttons, for example, such an Ada button 1904, a C button 1906, a FORTRAN, button 1908, and the like. When the user selects one of the buttons 1904-1908, the Main page 1500 can be active again and the exemplary test suite can be configured for testing in the selected language. The window 1900 can further include a Cancel button 1910 for performing the indicated function. Once the source code language can be determined, the Stub Generator button 1508 on the main menu 1500 can be selected. In an exemplary embodiment, when the user selects the button 1508, a stub generator page can be displayed.

Figure 20:
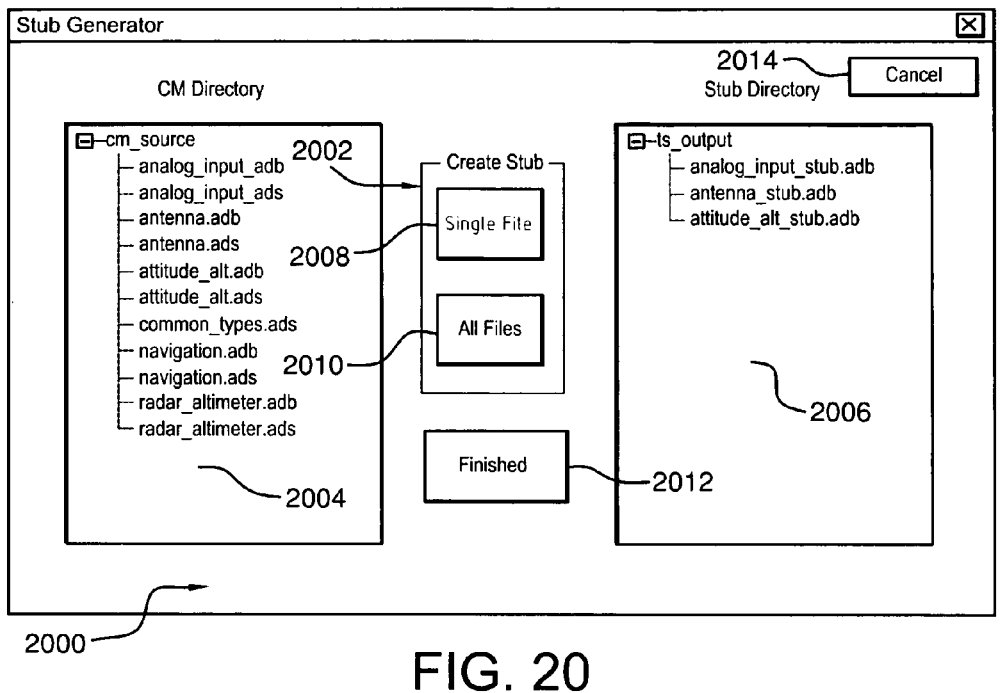
Figure 21:
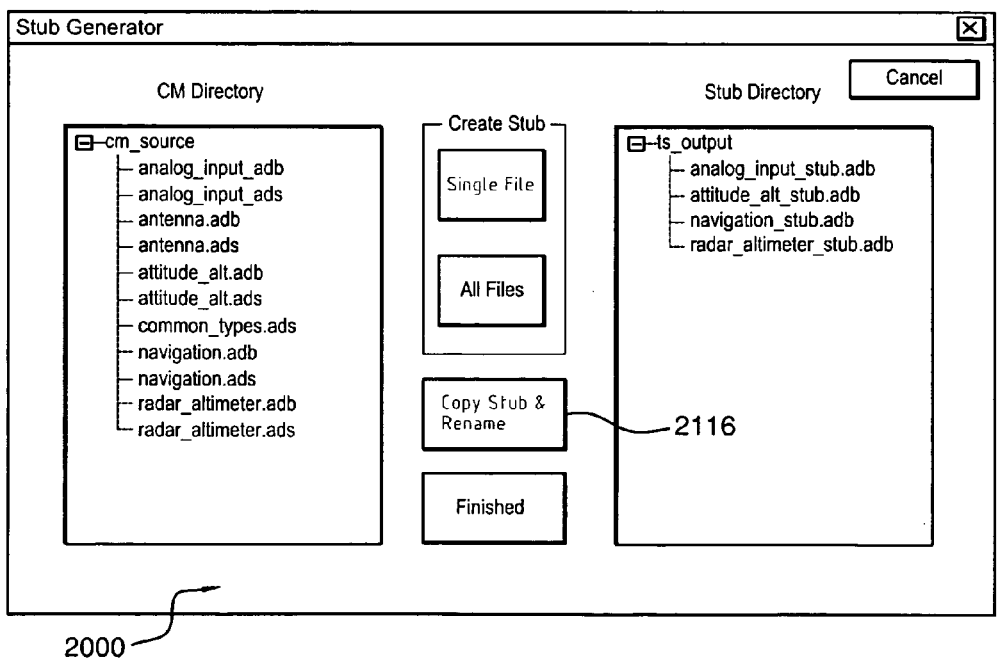
Figure 22:
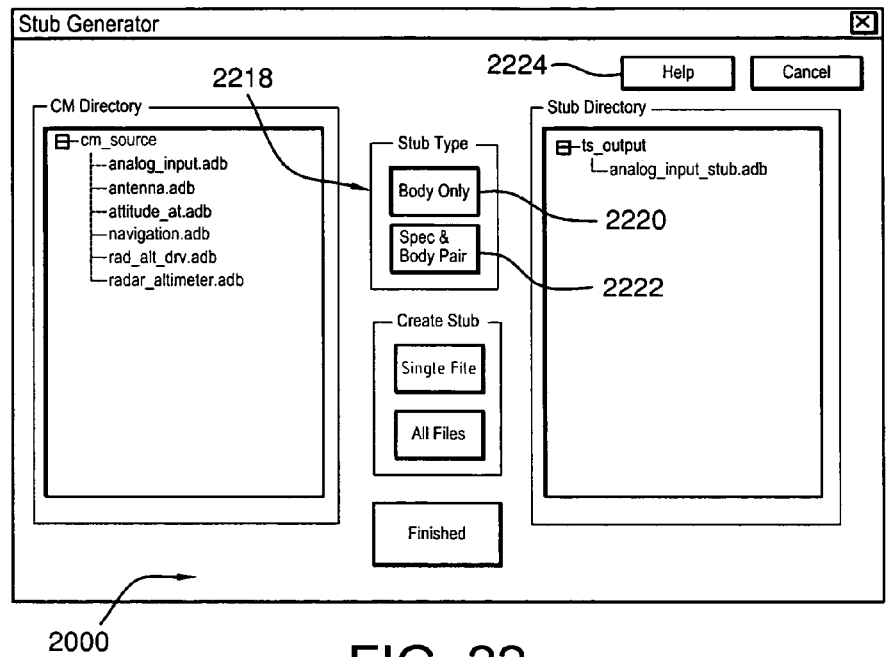

FIGS. 20-22 illustrate a Stub Generator page 2000 (e.g., when set to Ada), according to various exemplary embodiments. In FIGS. 20-22, the exemplary Stub Generator page 2000 can include a listing of directories 2004 and 2006 separated by a Single File button 2008, an All files button 1010 of a Create stub portion 2002, a Copy stub & Rename button 2116, a Finished button 2012, a Body Only button 2220 and a Spec & Body Pair button 2222 of a window portion 2218, and the like. The exemplary window 2000 can further include a Cancel button 2014 and a Help button 2224 for performing the indicated functions.

In an exemplary embodiment, the CM directory portion 2004 can be configured for listing and displaying the files in the cm_source directory 106 and which can be selected, for example, via highlighting, and the like. The stub directory portion 2006 can be configured for listing and displaying the stubbed files, for example, as they are generated. After the user selects a source file to be stubbed, the user can then select the Single File button 2008 of the Create Stub window portion 2002. The appropriate stubbed files can then be generated. The user can also generate stub files for all the source files by selecting the All Files button 2010. The stub generator page can be configured to invoke functions, for example, including a list_dir function, and a stub_gen function.

In an exemplary embodiment, selecting the Spec & Body Pair button 2222 creates a spec and a compatible body that contains variables that the user can set in the driver. The values of such variables can be returned to a calling routine at the appropriate time. Advantageously, this allows the stub to return particular values based on a test case number.

In an exemplary embodiment, the stub generator window 2000 can be configured to include the CM Directory window portion 2004 that lists the files under configuration management, the Stub Directory window portion 2006 that lists the stubbed files created by the test tool in the ts_output directory 108, the Body Only button 2220 that allows a user to stub a package body only, the Spec & Body Pair button 2222 that allows the user to stub both spec and body of a package, the Single File button 2008 that allows the user to select one file from CM directory 2004 and which can be stubbed and stored in the ts_output directory 108 and displayed in the Stub Directory window portion 2006, and an All files button 2010 that allows the user to select all files in the CM Directory window portion 2004 for stubbing and storage in the ts_output directory 108 and displaying in the Stub Directory window portion 2006.

In an exemplary embodiment, the list directory functionality, via the list_dir function, can be invoked to generate a file named cm_list.txt or stub_list.txt based on input parameters. The text file can include a directory list of the source files located in the passed in path. The corresponding inputs and outputs can be given, as follows:

| inputs: | Path - cm or stub |
| --- | --- |
|  | Mode - 1=cm, 2=stub |
|  | Spec_suffix - .ads |
|  | Body_suffix - .adb |
| outputs: | C:\test_suite\cm_list.txt |
|  | C:\test_suite\stub_list.txt |

In an exemplary embodiment, the stub generator functionality, via the stub generation function (e.g., called stub_gen) can be provided. The stub generator can receive a cm source module as an input and output a stubbed source module. In an exemplary embodiment, calculations and logic included within functions and procedures can be removed. The created stubbed file can be configured to compile error free. The corresponding inputs and outputs can be given, as follows:

| inputs: | source_path - source path directory |
| --- | --- |
|  | source_name - the name of the source to be stubbed |
|  | dest_path - destination path directory |
| outputs: | source_name_stub.adb |

Figure 23:
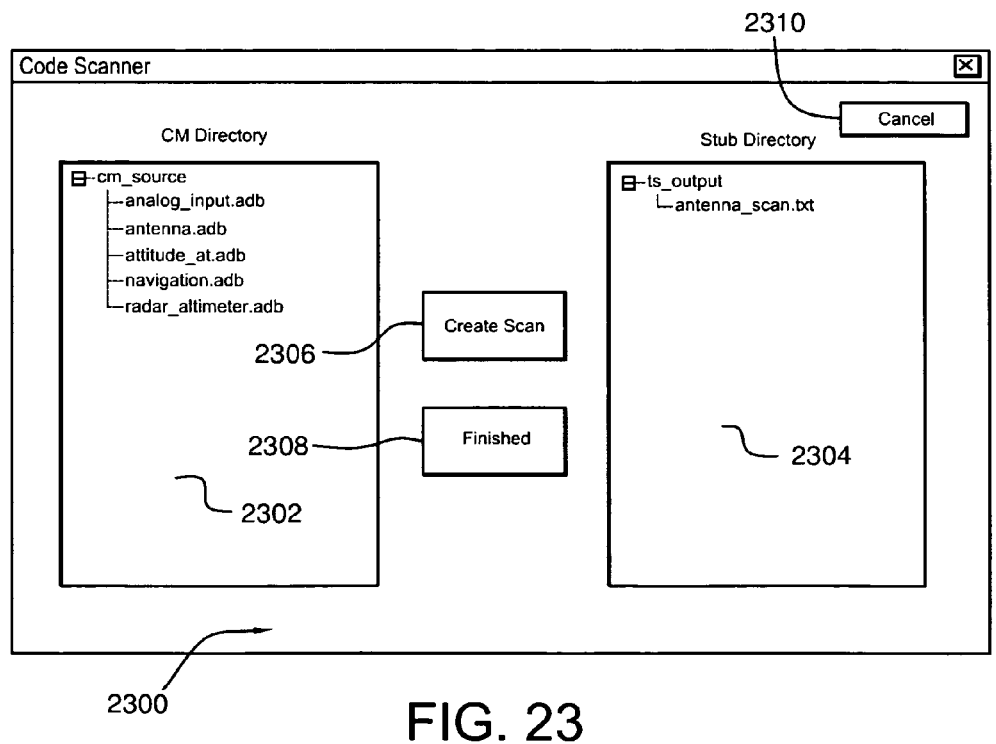
Figure 25:
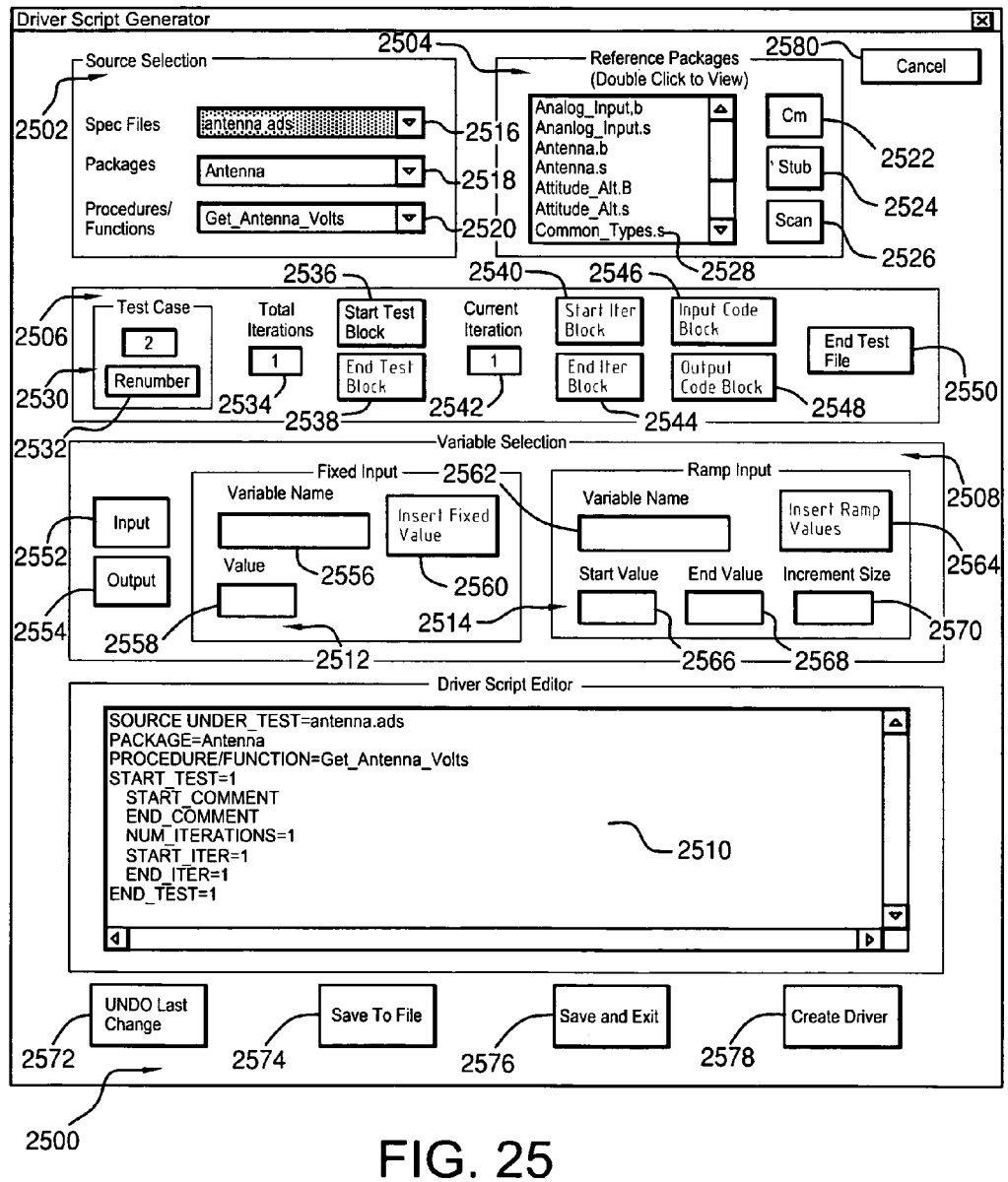
Figure 26:
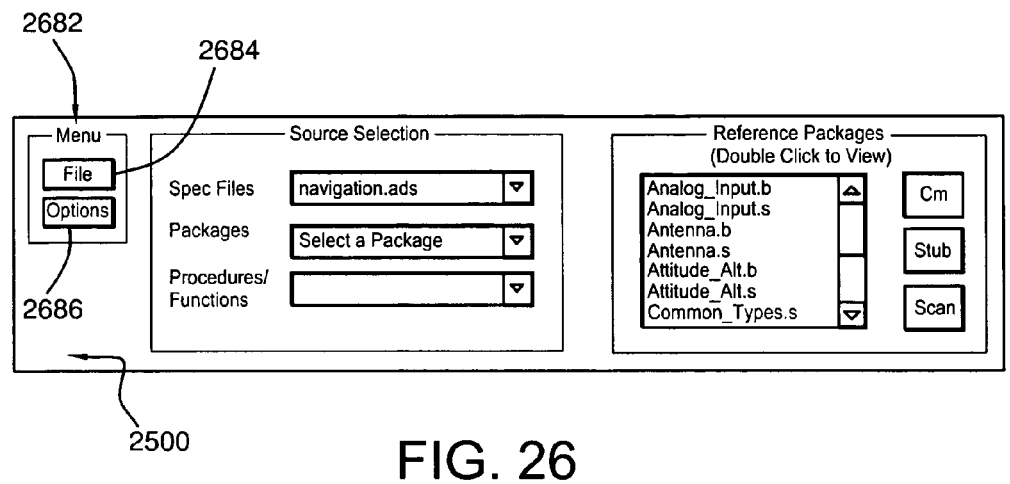
Figure 27:
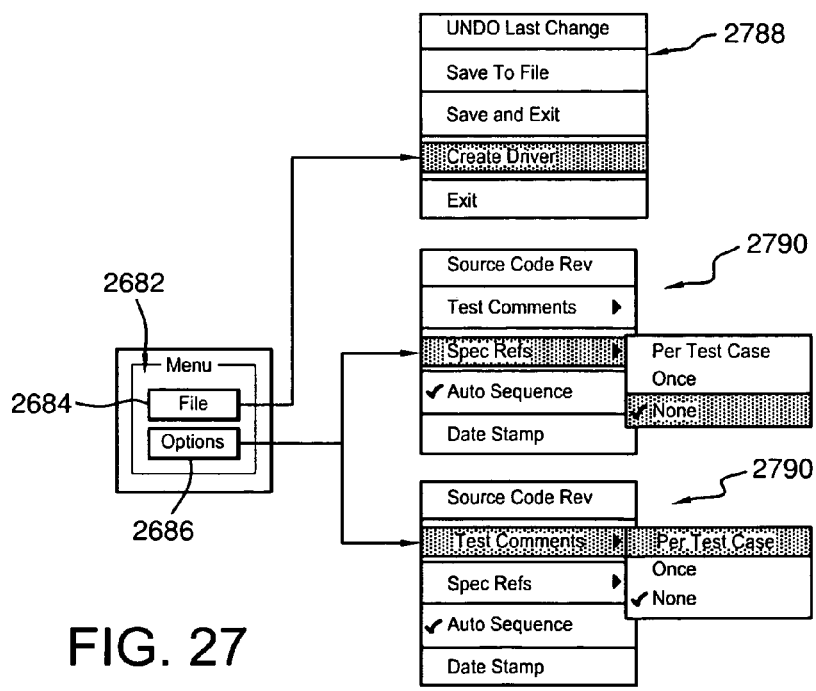
Figure 28:
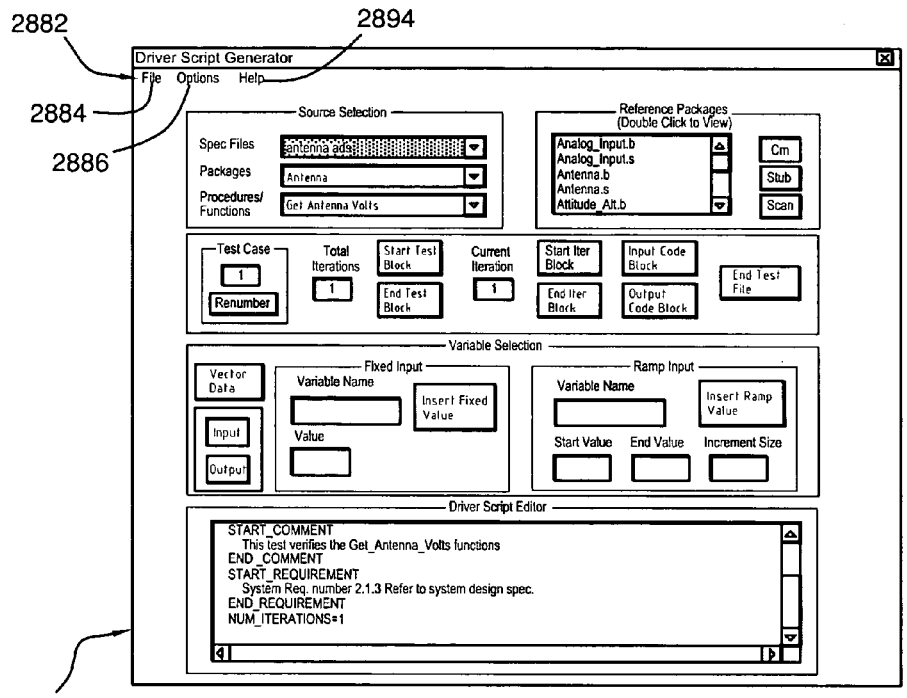
Figure 29:
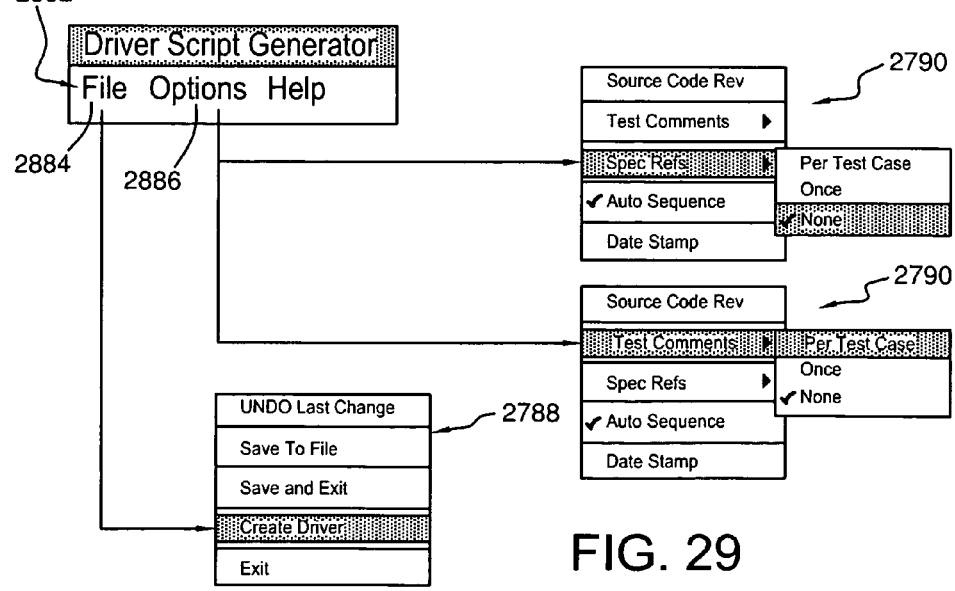
Figure 30:
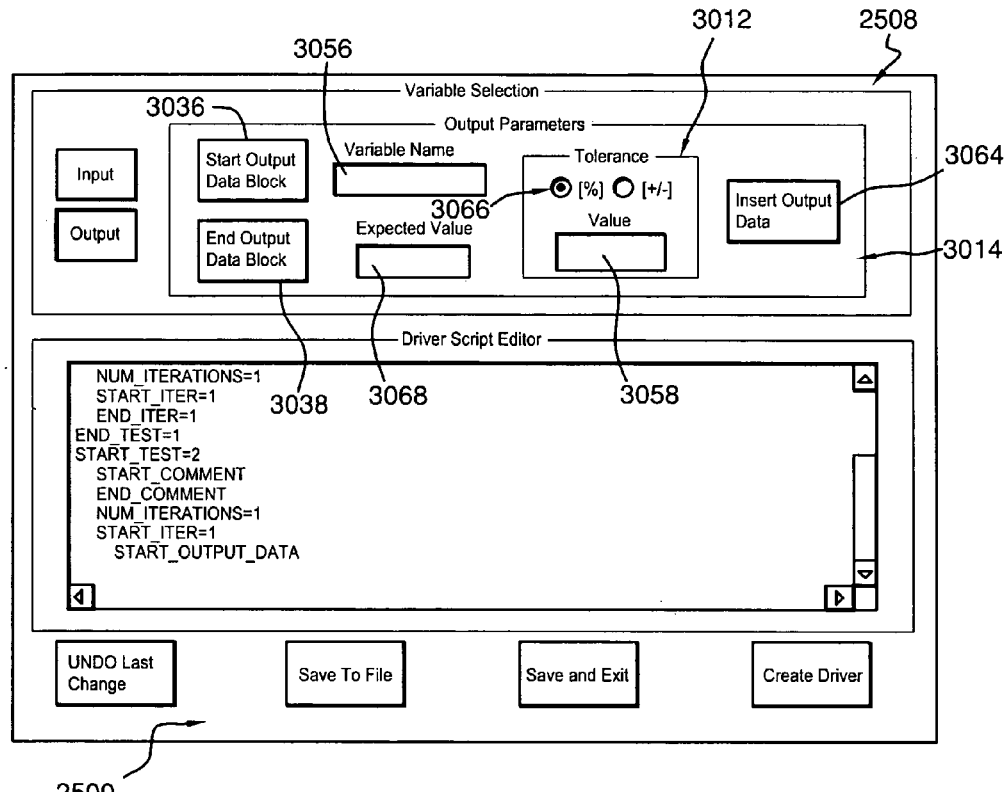
Figure 31A:
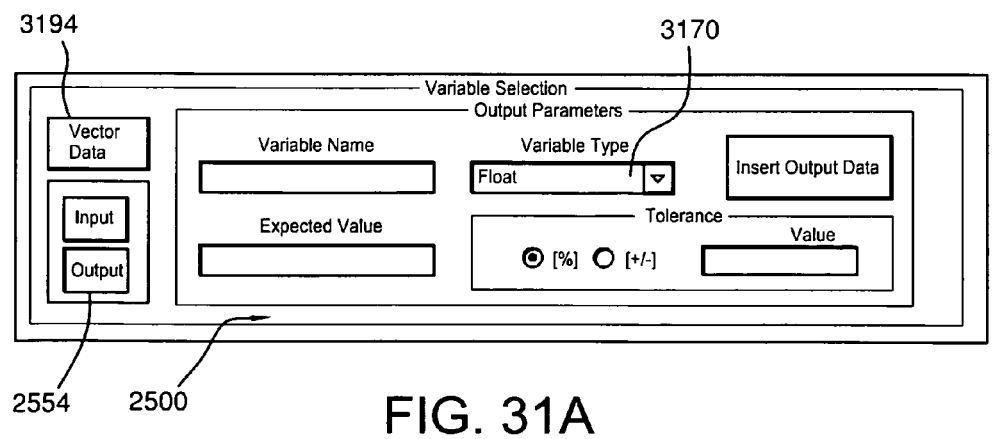
Figure 31B:
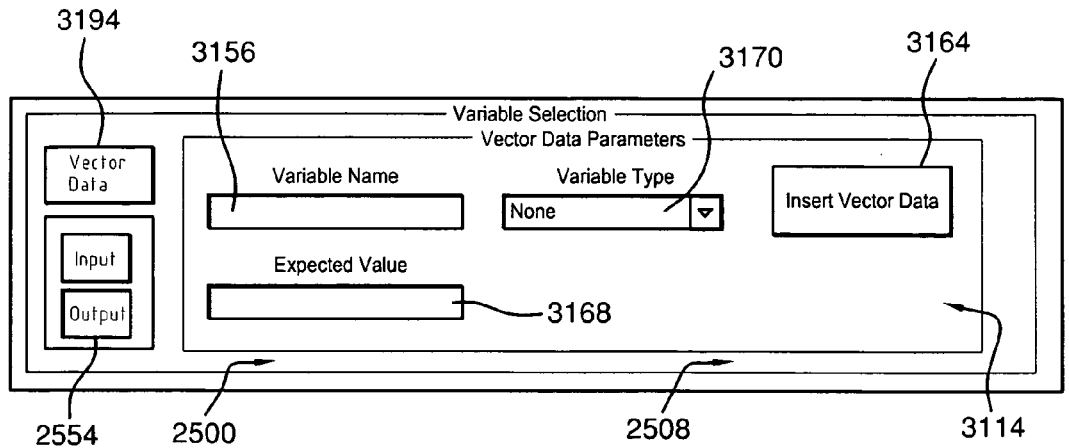
Figure 32:
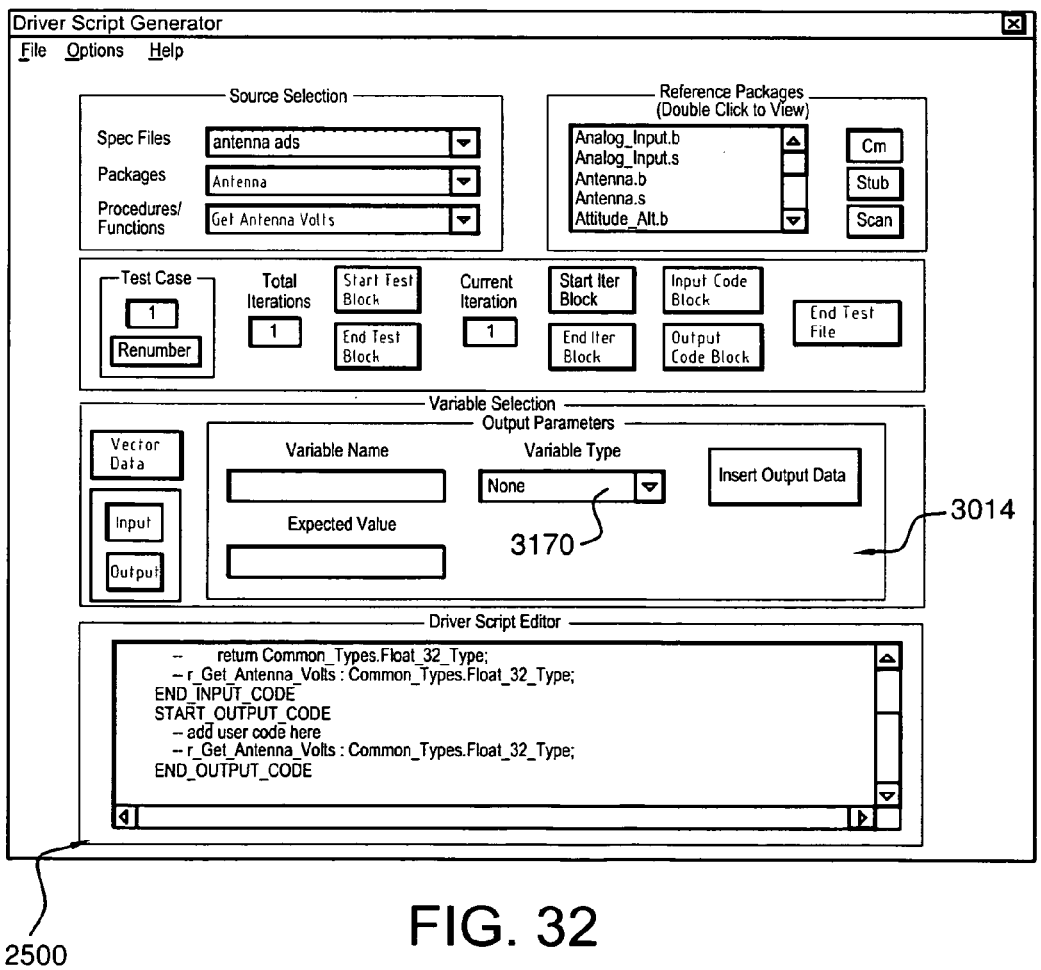

In an exemplary embodiment, when the user selects the code scanner button 1510 on the Main Menu page 1500, a code scanner window can be displayed. FIG. 23 illustrates a Code Scanner Window 2300, according to an exemplary embodiment. In FIG. 23, the window 2300 can include a listing of directories 2302 and 2304 separated by a Create Scan button 2306, a Finished button 2012, and the like. The exemplary window 2300 can further include a Cancel button 2310 and a Help button (not shown) for performing the indicated functions.

In an exemplary embodiment, the CM directory listing window portion 2302 can be configured to display the files of the cm_source directory 106 and which can be selected, for example, via highlighting, and the like. The Scan Directory window portion 2304 can be configured for display the files of the ts_output directory 108 and which can be selected, for example, via highlighting, and the like. The user can selects a source file to scan from the CM directory listing window portion 2302, and select the Create Scan button 2306, which can generate the corresponding scanned file (e.g., text format, and the like), and which can be displayed in the Scan Directory window portion 2304.

In an exemplary embodiment, the Code Scanner window 2300 can be configured to include the CM Directory window portion 2303 that can list files under configuration management, Scan Directory window portion 2304 that can list files created by the exemplary tool suite, the Create Scan button 2306 that can allow the user to select a file from the CM Directory window portion 2303 for scanning. In an exemplary embodiment, a text file including test gates, PDL, source metrics, and the like, can be generated and stored in the ts_output directory 108, which can be displayed in the window portion 2304.

FIG. 24 illustrates an exemplary scan file 2400 that can be displayed in a word-processing application, such as Windows Notepad, and the like, by selecting, for example, by double clicking, and the like, a newly created scan file in the window portion 2304. In an exemplary embodiment, the generated scan file 2400, for example, can include a synopsis of gates included in the scanned source file, corresponding metrics, and the like.

Figure 33:
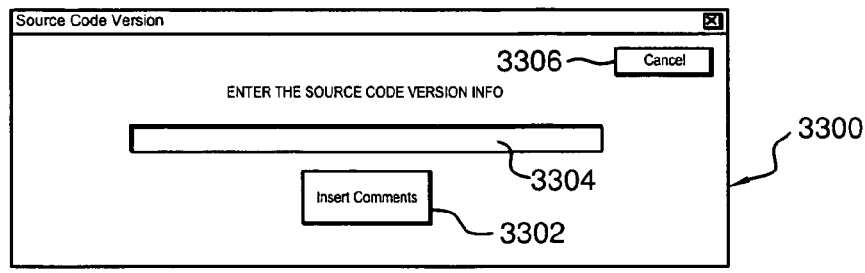
Figure 34:
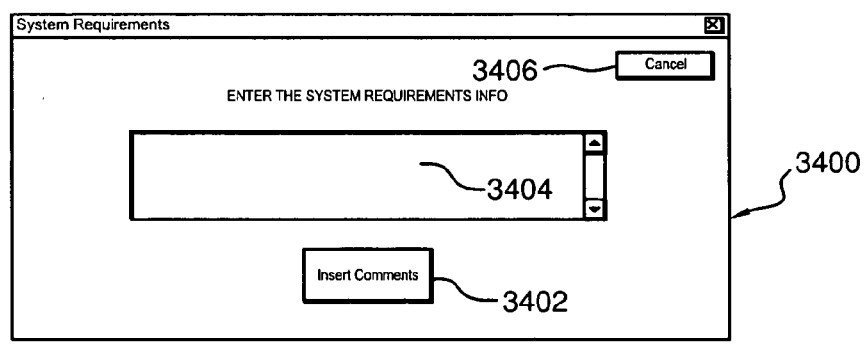
Figure 35:
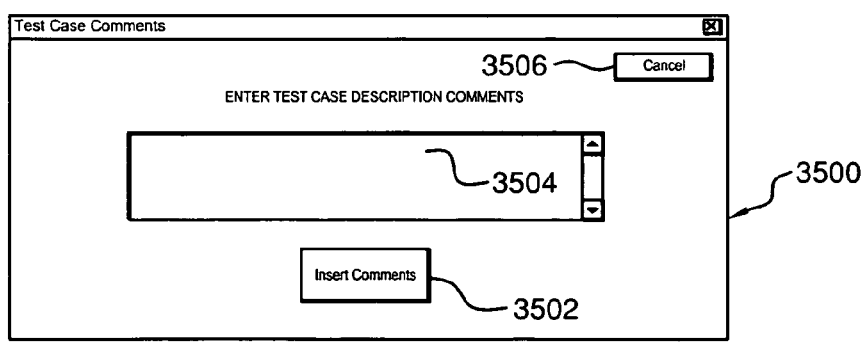

In an exemplary embodiment, when the user selects the Driver Script button 1512 on the Main Menu page 1500, a driver script generator window 2550, for example, as shown in FIGS. 25-32, can be displayed and defaulted for allowing input of parameters, for example, after the user is prompted information via the windows or pages 3300-3500 of FIGS. 33-35. In FIG. 33, the Source Code Version page 3300 allows for entry a version of source code under test, in the field 3304, when the page 3300 is automatically displayed. The exemplary window 3300 can be configured to allow the entered data to be inserted into a test script, via the Insert Comments button 3302, and can include a Cancel button 3306 for performing the indicated function.

In FIG. 34, the System Requirements page 3400 can be configured to allow entry of system requirements, and the like, that code under test is to be tested under in a window portion 3404. The exemplary window 3400 can be configured to be displayed automatically for each different test case. The exemplary window 3400 can be configured to allow the entered data to be inserted into a test script, via the Insert Comments button 3402, and can include a Cancel button 3406 for performing the indicated function.

In FIG. 35, the Test Case Comment page 3500 can be configured to allow entry of comments, for example, for describing the test being performed in the corresponding section of the test script, and the like, in a window portion 3504. The exemplary window 3500 can be configured to be displayed automatically for each different test case. The exemplary window 3500 can be configured to allow the entered data to be inserted into a test script, via the Insert Comments button 3502, and can include a Cancel button 3506 for performing the indicated function.

FIGS. 25-32 illustrate a Driver Script Generator window 2500, according to various exemplary embodiments. In an exemplary embodiment, the window 2500, when initially displayed, can be defaulted with an input button 2552 selected for allowing entry of the input parameters. Then, by selecting an output button 2554, entry of the output parameters can be performed.

In an exemplary embodiment, the window 2500 can include a menu portion 2682 or 2882, for example, including an Options button 2686 or pull-down menu 2886, and the like, for allowing selection of various options for the exemplary tool. An auto sequence option can be provided via the Options button 2686 or menu 2886 to allow sequencing of the various menus and buttons as the data is entered, advantageously, allowing the data to be entered in a correct or appropriate order. The exemplary window 2500 can include a Driver Script Editor screen portion 2510 configured to display script commands, and the like, that are automatically inserted, as the various buttons, menus, fields, and the like, of the exemplary window 2500 are selected.

In an exemplary embodiment, when updating a previously created script, the auto sequencing option can be unselected, and a cursor can be placed in an area where the script is to be edited and the appropriate changes, such as additions, deletions, and the like, can be made to the script. The exemplary window 2500 can include a Reference Packages section 2504 configured to allow selection of a directory for viewing. The user can select, for example, by double clicking, and the like, on a source module shown in a window portion 2528 and which can be displayed in a notepad window. Such a feature, advantageously, allows the user to view, copy, paste, and the like, variables, data, parameters, and the like, into a script page, driver page, and the like, in a seamless manner.

The Driver Script Generator window 2500 can include file selection menus, buttons, fields, and the like, for example, including the menus sections 2682 and 2882, including a File button 2684 or menu 2884 configured to activate pull-down menu 2788, the Options button 2686 or menu 2886 configured to activate pull-down menu 2790, and the like. The exemplary window 2500 further can include a Help menu 2894 or button (not shown), a Cancel button 2580, and the like, configured to perform the indicated function.

In an exemplary embodiment, the Reference Packages section 2504 of the window 2500 can include a CM button 2522 configured to list the files in the CM source directory 106, a Stub button 2524 configured to list the stub files in the TS output directory 108, a Scan button 2526 configured to list the scan files in the TS output directory 108, and the like, wherein selecting of a file in the window portion 2528, for example, by double clicking, and the like, can allow the corresponding file to be opened in a specified editor, for example, a word processing application, such as Windows Notepad, and the like.

In an exemplary embodiment, a Source Selection section 2502 of the exemplary window 2500, when configured for Ada, can include a Spec files pull-down menu 2516 configured to allow, for example, selection of an Ada Spec file of the UUT, and the like, a Packages pull-down menu 2518 configured to allow, for example, selection of an Ada Package name of the UUT, a Procedures/Functions pull-down menu 2520 configured to allow, for example, selection of an Ada procedure/function of the UUT. In an exemplary embodiment, if a corresponding script of the selected procedure or function exists, the script can be loaded into the Driver Script Editor window 2510.

In an exemplary embodiment, the Menu selection portions of 2682 and 2882 of the exemplary window 2500 can include the File button 2684 or menu 2884 configured to activate pull-down selections menu 2788, for example, that allows saving of the current script file, creation of a driver from the generated script file, and the like. The Options button 2686 or menu 2886 can be configured to activate pull-down selections menu 2790, for example, that can include selections for turning on and off the Auto Sequence mode that can be used to activate appropriate menus, buttons, and the like, at a correct time or in correct order, selections for specifying when to be prompted to enter the system requirements text, the test comments text, and the like.

In an exemplary embodiment, the exemplary window 2500 can include a Test Case Setup portion 2506, including a Test Case portion 2530 having a field configured for entry of a desired test case number in a suitable range (e.g., 1 to 10, 100, 1000, etc.), a Renumber button 2532 configured to allowing automatic renumbering of the test cases, and the like. The exemplary Test Case Setup portion 2506 can further include a Start Test Block button 2563 configured to add a delimiter to the Driver Script Editor window 2510, for example, stating the start of a test case, an End Test Block button 2538 configured to add a delimiter to the Driver Script Editor window 2510, for example, stating the end of the test case, an End Test File button 2550 configured to add a delimiter to the Driver Script Editor window 2510, for example, stating the end of the test file, a Total Iterations field 2534 configured to allow specifying of a number of loops in the test case in a suitable range (e.g., 1 to 10, 100, 1000, etc.), a Current Iteration field 2542 configured for displaying the current iteration of the test case being created, and the like.

In an exemplary embodiment, the exemplary Test Case Setup portion 2506 can further include a Start Iteration (Iter) Block button 2540 configured to add a delimiter to the Driver Script Editor window 2510, for example, stating the start of current iteration, an End Iter Block button 2544 configured to add a delimiter to the Driver Script Editor window 2510, for example, stating the end of current iteration, an input Code Block button 2546 configured to add a delimiter to the Driver Script Editor window 2510 to declare inputs and which displays a Variable Selection portion 2508 configured for input mode, an output Code Block button 2548 configured to add a delimiter to the Driver Script Editor window 2510 to declare outputs and which displays the Variable Selection portion 2508 configured for output mode, and the like.

The exemplary window 2500, in input mode, for example, with the input button 2552 selected, allows for entry of information, for example, including the source to be tested, the number of cycles the selected tests are to be performed (e.g., as an integer that can be passed to the control driver) and which parameters can be used by a scheduler, and the like. The exemplary window 2500 further allows the user to select fixed input, for example, via highlighting, selecting, and the like, and an Insert Fixed Value button 2560, and to set a corresponding value in a Value field 2558. The user can also be allowed to select ramp input, for example, via highlight and select, and an Insert Ramp Values button 2564.

In an exemplary embodiment, when the Insert Ramp Values button 2564 is selected, the user can be allowed to input a starting value and an ending value for that particular input in corresponding fields 2566 and 2568. Such values can be passed to the control driver and the scheduler can utilize the corresponding parameters. The user can select, for example, via highlighting, and the like, the test numbers that are to be run, and which can be inputted to the control driver and the corresponding parameters can be utilized by the scheduler.

In an exemplary embodiment, the Variable Selection portion 2508 of the exemplary window 2500 can include the input button 2552, which can be selected, for example, by depressing, for configuring Variable Selection portion 2508 for setting of the input parameters. A Fixed input section 2512 of the Variable Selection portion 2508 can be configured to allow entry of a variable name for the input in a field 2556, entry of value of the desired input in the field 2558, and the like, and the Insert Fixed Value button 2560 can be configured to the delimiter stating the fixed variable name and value.

In an exemplary embodiment, a Ramp input section 2514 can be configured to allow entry of the variable name of the input in a Variable Name field 2562, entry of a start value of the desired input in the Star Value field 2566, entry of the end value of the desired input in the End Value field 2568, entry of an increment size in an Increment Size field 2570, and the like. The Insert Ramp Values button 2564 can add the delimiter stating the ramped variable name, the start and end values, and the increment size. The Driver Script Editor window 2510, in input mode, can be configured to be populated with selected delimiters from other sections, with user selected inputs, can be editable, and the like.

In an exemplary embodiment, the user can enter output parameters by selecting, for example, by depressing, the Output button 2554 on the Driver Script Generator page 2500. In output mode, the exemplary page 2500 can be configured to display a listing of available outputs that can be monitored in the window portion 2510, stored into a file, and the like. In an exemplary embodiment, the corresponding output parameters can be passed to the control driver.

In an exemplary embodiment, the Variable Selection portion 2508 of the exemplary window 2500 can include the Output button 2554, which can be selected, for example, by depressing, for configuring Variable Selection portion 2508 for setting of the output parameters. An Output Parameters section 3014 can be configured to allow entry of a variable name of the output in a Variable Name field 3056, entry of an expected value of the desired output in an Expected Value field 3068, entry of the variable type of the desired output with a Variable Type pull-down menu 3170, entry of a tolerance of the selected output with % and +/− sections 3066 and value field 3058 of a Tolerance window portion 3012, and the like. An Insert Output Data button 3064 can be configured to add a delimiter to the Driver Script Editor window 2510, for example, stating the selected output variable name, expected value, tolerance, and the like.

In an exemplary embodiment, a Vector Data button 3194 can be used to configure the Variable Selection window portion 2508 to include a Vector Data Parameters portion 3114 for setting of vector data. The portion 3114 can be configured, for example, to allow entry of a variable name of the vector data in a Variable Name field 3156, entry of an expected value of the desired vector data in an Expected Value field 3168, entry of a variable type of the desired vector via the pull-down menu 3170, and the like. An Insert Vector Data button 3164 can be configured to add a delimiter to the Driver Script Editor window 2510, for example, stating the vector data variable name, expected value, the type, and the like.

In an exemplary embodiment, the exemplary Driver Script Generator window 2500 allows for controlling of the creation of a script file, which can be used to generate a driver that executes all suitable input combinations and lines of code, allows for specifying of outputs to be monitored, pass/fail tolerances, vector data to be monitored, and the like, with editing information being displayed in the Driver Script Editor window 2510.

Figure 36:
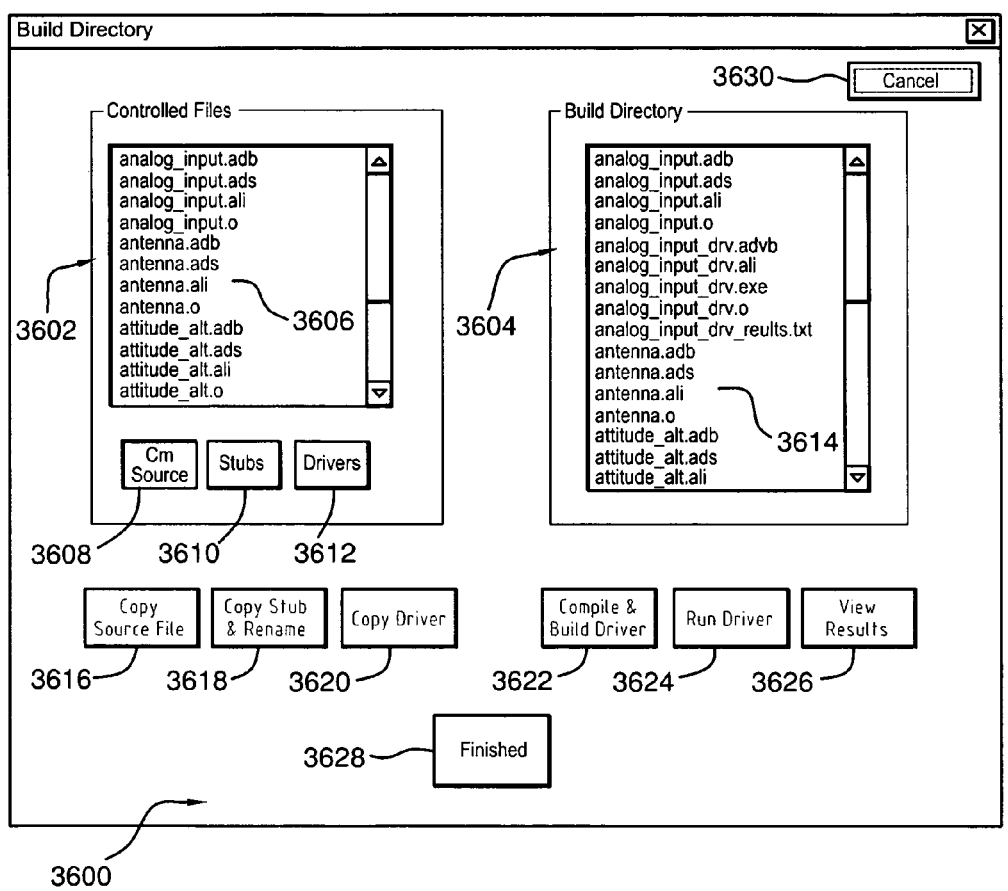
Figure 37:
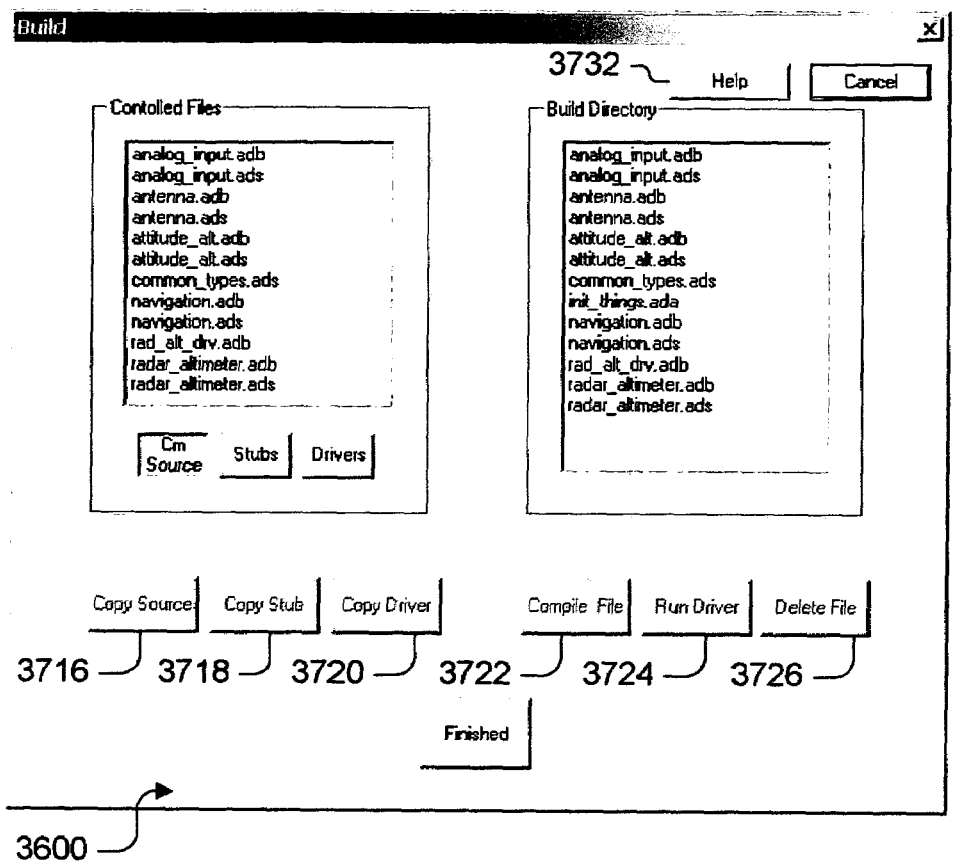

FIGS. 36-37 illustrate a Build Directory page or window 3600, according to various exemplary embodiments. The exemplary window 3600 can be selected from the Main Menu page 1500 via the Build Directory button 1514. In FIGS. 36-37, the page 3600 can be configured to allow copying of the employed software into the build directory 104. The user can compile and build the test driver, via button 3622, for example, using a compiler configured for the selected language, run the test driver, via button 3624, observe the Test Results Report file 1400, via button 3626, copy the source, stub, and driver files, via buttons 3616-3620, and the like. In an exemplary embodiment, the build directory 104 can include drivers, source, and the like, that are employed for complete compiling and linking. For example, the executable 502 can be created in the build directory 104.

In an exemplary embodiment, the Build Directory page 3600 can include a Controlled Files window portion 3602 configured to list, in a window portion 3606, the associated files dependent upon a selected one of the buttons 3608-3612. The exemplary page 3600 also can include a Build Directory window portion 3604 configured to list, in a window portion 3614, the files that can be utilized to create the executable. In an exemplary embodiment, the CM Source button 3608 can be configured to list the files under configuration management, the Stubs button 3610 can be configured to list files that where created as stubs, the Drivers button 3612 can be configured to list driver files that where generated, and the like.

In an exemplary embodiment, Copy Source, Copy stub, and Copy Driver buttons 3716-3720 can be configured to copy a highlighted file in the Controlled Files windows portion 3602 to the Build Directory window portion 3614. The exemplary Build Directory page 3600 can further include, for example, a Finished button 3628, a Cancel button 3630, and a Help button 3732, configured to perform the indicated function.

Figure 38:
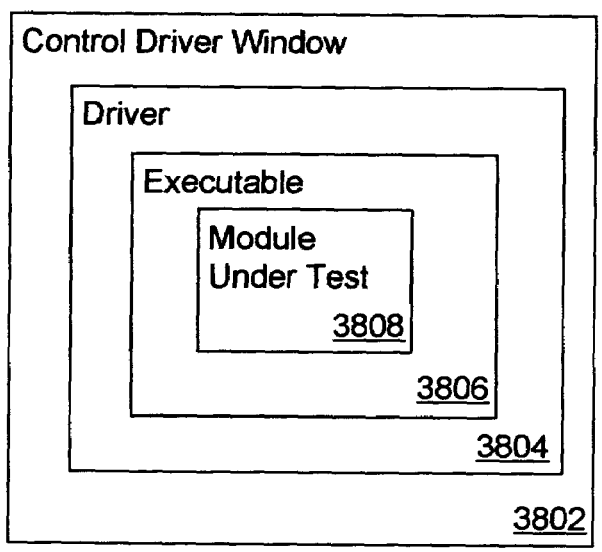
FIG. 38 illustrates a software calling hierarchy, according to an exemplary embodiment.

FIG. 38 illustrates an exemplary software calling hierarchy 3800. In FIG. 38, once inputs and outputs have been declared in the driver script via the control driver window 3802, the driver script can be configured to create the control driver 3804 in the language specified. The control driver then can be compiled and a linked executable 3806 can be created. The executable 3806 can be run and can test the prime code to create the results file 1400 for the module or unit under test 3808 and that can include the specified outputs and results of executing the prime code with the specified inputs.

In an exemplary embodiment, various objects, functions, procedures, subroutines, handlers, error codes, and the like, for performing the processes described with respect to exemplary embodiment of FIGS. 1-38, can be provided, for example, as further described below and with respect to Table 1. In an exemplary embodiment, a stub generator object can be configured to include subroutines that can parse the inputted source modules from the user interface and strip out the code between the start of each function or procedure and the end of each function or procedure. The stub generator can insert a print statement in each function or procedure that is sent to the user interface to report status. The stub generator subroutine that is called from the user interface can depend on the language selected. The stub generator can create a stubbed file in the specified destination directory with the <filename>_stub notation. Comment lines and declarations can be included in the stubbed file. Error reporting can be to the user interface system message window. In an exemplary embodiment, an ada_stub_generator function, and the like, can be configured to create Ada stubs, and the like.

In an exemplary embodiment, a code scanner object can be configured to scan the inputted source file that is under test. The resultant text file can include a synopsis of each loop, and an if, case or switch statement for each procedure and function for both the parent module and any children. For each of the above, the code scanner can generate a test case number, wherein the test case number can be utilized by the driver as a map or tree structure for complete gate testing. When the code scanner is run, the code scanner can produce a mapping of source packages in both the source code directory and the stub directory. Such a mapping can include the source name of the package (e.g., aircraft_state.adb) and the procedures and functions included in a given package. Next, the code scanner can generate the test case numbers and a pseudo path coverage tree structure. Finally, the code scanner can produce a common structure, which can be used by a driver generate object.

--- source_scan -- This function scans a source file for gates (ifs, loops, cases). Also notes some source metrics. The output file created is the source_to_scan with the suffix "_scan.txt"
    Returned Error Codes:
        5001 = error opening source_to_scan file.
        5002 = error opening "_scan.txt" file.
        5003 = error determining output file name.
        5005 = error writing to file.
        5006 = error reading from cm file.

---

In an exemplary embodiment, a driver object can be configured to create functions that execute the source under test. The driver can be configured to be responsible for calling functions that execute the source under test, for example, at a specific rate defined by the user from the user interface component. The execution rate of the driver can be specified, for example, as low as a one shot execution and as high as a rate of 50 Hz. The driver also can be configured to be responsible for ramping of values specified in the input and output parameters. The driver also can be configured to set data based on test case number, iteration count, and the like (e.g., set weight_on_wheels flag to true for iterations 1-6, set false for iteration count 6 through to the end, and the like). The driver also can be configured to set data based solely on test case number (e.g., set weight_on_wheels flag true for test cases 1-20, set false otherwise, and the like). The driver can include a preset fixed number of test cases (e.g., FFF or 4095, and the like). The test case numbers can be generated via the code scanner. The driver can be configured to be language specific based on the module under test.

--- generate_driver- Creates the driver.

7510 - Error opening the control driver file for writing.

7520 - Error opening the control driver file for writing.

add_the_header - Writes the header to the output file.

output_results_header

-continued

```
            7410 - Error opening the input file.
            process_iterations - Finds the number of iterations and prints them out to a file.
            7310 - Error opening the input file.
            process_withs - Scans the input file and picks out the withs. Then it prints out withs
to a file.
            7010 - Error opening the input file.
            process_declarations -- Scans the input file and picks out the declarations. Then it
prints out the declarations to a file.
            7110- Error opening the input file.
            process_outputs -- Processes output information, (variable name, expected values,
type of outputs, and threshold name) and places that information into the following arrays:
                out_var_name
                exp_val_name
                threshold_name
                output_type
            This information is then used by the routine process_iterations and printed to the output
            file.
            helper routines -
            gen_ada_dir_lists - This function generates two files cm_list and stub_list. These
            files include a list of source files that are located in the cm and stubs directories.
            check_source_file_names - This function checks the source file names located in the
            stub_list and cm_list files for correctness.
            scan_stub_source_files - This function scans each stub source file for package name,
            functions, and procedures. The output file is stub_scan.txt.
            scan_cm_source_files - This function scans each cm source file for package name,
            functions, and procedures. The output file is cm_scan.txt.
            cs_package_xref - This function scans each of the files located in the cm_list.txt file
            for the "real" package name. The output file is named package_xref.txt.
                Returned Error Codes:
                    4000 - Error opening cm_list.txt file.
                    4001 - Error opening package_xref.txt file.
                    4002 - No files where found.
                    4003 - Error opening one of the cm files.
                    4004 - Error writing to package_xref.txt.
            gen_pkg_info - This function scans the cm package and produces a structure that can
provide information to:\
        populate the gui window
        build the scheduler
        build the driver
        driver source code
    Returned Error Codes:
            6000 - Error opening the cm file.
            6001 - Spare.
            6002 - Error reading cm source file
        The structure produced is the following:
    struct package_type {
            char name[STR_MAX];
            int num_of_procedures;
            char
name_of_procedures[PROCEDURES_MAX][STR_MAX];
            int num_inputs[PROCEDURES_MAX];
            char
inputs[PROCEDURES_MAX*5][STR_MAX];
            int num_outputs[PROCEDURES_MAX];
            char
outputs[PROCEDURES_MAX*5][STR_MAX];
            int num_p_f_lines[PROCEDURES_MAX];
            char
p_f_text[PROCEDURES_MAX*5][STR_MAX];
            int num_drv_lines[PROCEDURES_MAX];
            char
drv_text[PROCEDURES_MAX*5][STR_MAX];
            };
                struct common_type {
                    char drv_name[STR_MAX];
                    int num_of_withs;
                    char withs[WITHS_MAX][STR_MAX];
                    int num_packages;
                    struct package_type package[PKG_MAX];
                };
                struct common_type spec;
    STR_MAX 256
    PKG_MAX 5
    WITHS_MAX 25
    PROCEDURES_MAX 50
            read_setup_file - This function scans the setup.txt file and populates a structure that
can provide information to the rest of the exemplary test suite.
```

```
Language:
    1 = Ada
    2 = C
    3 = FORTRAN
Returned Error Codes:
    -1010 - Error opening the setup file.
    -1020 - Language not specified.
    neg number - Missing needed data
    error handling - This module handles error processing.
error_handler - This function displays a text message based upon the error that occurred.
put_error_handler - This function returns an array of strings that include text messages
based upon the error that occurred.
get_error_message - This function returns an array of strings that include text messages
based upon the error that occurred.
    Returned Value:
        0=no error file exists.
        1=indicates that a error file exists.
```

TABLE 1

Error Message for source of Error.

| Error Message | Source of Error |
| --- | --- |
| GUI ERROR OCCURED WHEN READING CM SOURCE LIST FILE | |
| GUI ERROR OCCURED WHEN READING STUB LIST FILE | |
| GUI ERROR OCCURED WHEN READING SCAN LIST FILE | |
| GUI ERROR IN EXIT STATUS OF RUN PROCESS | |
| ERROR OCCURED WHEN READING SETUP FILE | read_setup_file |
| ERROR OCCURED WHEN GENERATING THE STUB | ada_stub_generator |
| ERROR OCCURED WHEN CREATING XREF FOR PACKAGES | cs_package_xref |
| ERROR OCCURED WHEN SCANNING SOURCE | source_scan |
| ERROR OCCURED WHEN PROCESSING INFO FROM PACKAGE | gen_pkg_info |
| ERROR SCHEDULER/DRIVER - error in process_declarations | process_declarations |
| ERROR SCHEDULER/DRIVER - error in process_outputs | |
| ERROR SCHEDULER/DRIVER - error in process_iterations | Process_iterations |
| ERROR SCHEDULER/DRIVER - error in output_results_header | output_results_header |
| ERROR SCHEDULER/DRIVER - error in generate_scheduler | Generate_scheduler |
| ERROR OCCURED WHEN PROCESSING SCHEDULER/DRIVER | |

```
Errors are returned from the following routines:

read_setup_file
    1001 - Error determining directory paths
    1002 - Error determining correct language parameters
    1010 - Error opening the setup file
    1020 - Language not specified
cs_package_xref
    4000 - Error opening cm_list.txt file
    4001 - Error opening package_xref.txt file
    4002 - No files where found
    4003 - Error opening one of the cm files
    4004 - Error writing to package_xref.txt
source_scan
    5001 = error opening source_to_scan file
    5002 = error opening "_scan.txt" file
    5003 = error determining output file name
    5005 = error writing to file
    5006 = error reading from cm file
gen_pkg_info
    6000 - Error opening the cm file
    6001 - Spare
    6002 - Error reading cm source file
process_withs
    7010 - Error opening the input file.
```

```
-continued
Errors are returned from the following routines:

process_declarations
    7110- Error opening the input file.
process_iterations
    7310- Error opening the input file.
output_results_header
    7410- Error opening the input file.
generate_scheduler
    7510 - Error opening the control scheduler file for writing
    7520 - Error opening the control scheduler file for writing
```

Advantageously, the exemplary test suite 202 can be configured to help eliminate the haphazard or non-consistent testing of the prime source code. The exemplary test suite 202 can allow one software engineer the capability of re-testing a test case of another engineer in a consistent and repeatable manner. The exemplary test suite 202 also can be configured for performing of regression testing of prime source code that has been updated due to design or integration changes. The exemplary test suite 202 can be configured to facilitate object level and unit testing processes by providing a user, for example, with a PC-based, Windows, GUI, and the like. The exemplary user interface 204 and/or 504 can be configured to allow entry and monitoring of values that a particular source code module utilizes. The driver 508 or scheduler interface can be configured to allow selection of a rate at which the source code module under test can be executed (e.g., from one shot, 50 Hz, etc.).

In an exemplary embodiment, the exemplary test suite 202 can be PC or work station-based (e.g., running under Windows, McIntosh, Linux, UNIX, etc.). The exemplary test suite 202 can be configured to employ windowing for the user interface 204 and/or 504, with data based on a common and easily transportable data interface (e.g., XML, etc.). The exemplary test suite 202 can be configured to support software testing of multiple source languages, stub generation, driver generation, FTP file transfer, code scanner functions for providing a list of procedures, functions, ifs, loops, switches, cases, test case, source code maps, and the like. The exemplary test suite 202 can be configured to allow scheduling of the execution of the source module, ease of picking and choosing a source module, input and output parameters, ease of data entry and monitoring of data, and the like. The exemplary test suite 202 can be configured to allow input parameters 514 to be ramped over iteration execution of the module under test, to allow input parameters 514 to be set to previous defined values based on test case number, and the like.

The exemplary test suite 202 can include the user interface 204 and/or 504, the stub generator 206, the code scanner 208, the translator 506, the shared memory 512, the driver generator 210, the scheduler, the executable 502, the build directory 104, and the like, components. The user interface 204 and/or 504 can be configured as an interface between a user and the exemplary test suite 202, for example, including a Windows GUI configured to allow the user to control various aspects of the object under test. For example, via the exemplary test suite 202, the user can control the language utilized, the user can start or stop the stub generator 206, the code scanner 208, and the like, the user can select an object to be tested, the user can control which test cases to run and iteration rates, the user can control the input and output of data, the user can specify data settings (e.g., ramping, ranges, etc.) based upon test case, iteration, and the like, the user can control the display of output values, in a window the user can view the selected output parameters set by the object under test, and the like.

In an exemplary embodiment, the stub generator 206, for example, can be configured as an off-line process utilizing, as an input, external source code modules that the source code module under test can employ. The exemplary stub generator 206 can be configured to replace data manipulation and logic code with a generic comment line (e.g., "This procedure has been stubbed," etc.). The user can determine, for example, if data manipulation, logic, a print statement, and the like, should be added to the stubbed procedure or function, advantageously, aiding the user when testing the module under test. The module under test, typically, need not be modified. The stubbed modules can be placed in a corresponding directory and can include a corresponding library. In an exemplary embodiment, if an object source code module employs a module that does not exist in the source code directory, the object source code module can be configured to automatically pull the corresponding source from the stub directory. The exemplary test suite can be configured to stub Ada specs, bodies, and separates, C bodies and header files, FORTRAN elements, and the like In an exemplary embodiment, the code scanner 208 can be configured as an off-line process and can employ the module under test as the input. The resultant text file can include a synopsis of each loop, if, case, switch statement, and the like, for each procedure and function for both the parent module and any children. For each of the above elements, the exemplary code scanner 208 can be configured to generate a test case number, which can be utilized by the driver 508 as a map or tree structure for complete gate testing, and the like. The exemplary scheduler can be configured to call the driver 508, for example, via a case number. The driver 508 can be configured to execute the correct procedure, functions, gates, and the like, to reach the source of the specified test case number.

In an exemplary embodiment, when the code scanner 208 can be run and configured to generate a mapping of source packages in the source code directory, the stub directory, and the like. Such a mapping, for example, can include the source name of the package (e.g., hello_world.adb, aircraft_state.adb, etc.), the procedures and functions included in the package, and the like. The exemplary code scanner 208 can be further configured to generate the test case numbers, a pseudo path coverage tree structure, and the like.

In an exemplary embodiment, off-line processes can be performed on a PC-based machine, UNIX-based machine, and the like, source code to be tested can include C, Ada, FORTRAN, and the like, an employed compiler can include a GNAT ADA compiler, a Greenhills ADAMULTI compiler, and the like, source code can reside on a PC-based machine, UNIX-based machine, and the like, tolerances for PASS/FAIL can be user configured (e.g., 5%, 10%, . . . , etc.), and the like.

Advantageously, the exemplary test suite 202 can allow a user to test software, thoroughly, without the user requiring extensive knowledge of the software under test. In an exemplary embodiment, this can be accomplished by allowing the user to test software using the user interface 205 or 504, wherein the user need not observe or change the software under test. Accordingly, manipulation of supporting code (e.g., stubs, input ramping, storing of outputs, etc.) can be performed automatically and invisibly to the user, via the exemplary test suite 202. The user can select the desired test or tests to be run, the language to be used, the rate of execution, the input values, the desired outputs to be monitored, and the like. The user can run the exemplary test suite 202, which, in turn, can run the code scanner 208, the stub generator 206, fetch the code under test, compile and link to create an executable, execute the generated driver and/or scheduler, output the results to a file, and the like.

Thus, the exemplary test suite 202 processes can simplify and standardize the level of object level and unit testing used in the verification of software (e.g., in an avionics box, etc.). The exemplary test suite 202 processes can allow the user to test software, thoroughly, with little knowledge of the actual function of the software under test, and can be configured to include unit, system (e.g., in the box) testing, and the like.

The above-described devices and subsystems of the exemplary embodiments of FIGS. 1-38 can include, for example, any suitable servers, workstations, Personal Computers (PCs), laptop computers, Personal Digital Assistants (PDAs), Internet appliances, handheld devices, cellular telephones, wireless devices, other devices, etc., capable of performing the processes of the exemplary embodiments. The devices and subsystems can communicate with each other using any suitable protocol and can be implemented, for example, using the computer system 3900 of FIG. 39. The devices and subsystems of the exemplary embodiments of FIGS. 1-38 can communicate with each other over a communications network such as the Internet, an intranet, a local area network (LAN), and the like.

One or more interface mechanisms can be used in the exemplary embodiments of FIGS. 1-38 including, for example, Internet access, telecommunications in any suitable form, for example, voice, modem, wireless communications media, and the like. Accordingly, a communications network can employed in the exemplary embodiments of FIGS. 1-38 and can include, for example, one or more wired or wireless communications networks, cellular communications networks, G3 communications networks, Public Switched Telephone Network (PSTNs), Packet Data Networks (PDNs), the Internet, intranets, and/or combination thereof, and the like.

It is to be understood that the exemplary embodiments of FIGS. 1-38 are for exemplary purposes, as many variations of the specific hardware and software used to implement the described embodiments are possible, as can be appreciated by those skilled in the relevant art(s). For example, the functionality of the devices and the subsystems of the exemplary embodiments of FIGS. 1-38 can be implemented via one or more programmed computer systems or devices.

To implement such variations as well as other variations, a single computer system (e.g., the computer system 3900 of FIG. 39) can be programmed to perform the special purpose functions of one or more of the devices and subsystems of the exemplary embodiments of FIGS. 1-38. On the other hand, two or more programmed computer systems or devices can be substituted for any one of the devices and subsystems of the exemplary embodiments of FIGS. 1-38. Accordingly, principles and advantages of distributed processing, such as redundancy, replication, etc., also can be implemented, as desired, for example, to increase the robustness and performance of the exemplary embodiments of FIGS. 1-38.

The exemplary embodiments of FIGS. 1-38 can store information relating to various exemplary processes described herein. This information can be stored in one or more memories, such as a hard disk, optical disk, magneto-optical disk, RAM, and the like, of the devices of the exemplary embodiments of FIGS. 1-38. One or more databases of the devices and subsystems of the exemplary embodiments of FIGS. 1-38 can store the information used to implement the exemplary embodiments of the present invention. The databases can be organized using data structures (e.g., records, tables, arrays, fields, graphs, trees, and/or lists) included in one or more memories, such as the memories listed above or any suitable storage devices, such as the storage devices listed below in the discussion of FIG. 39, and the like.

The exemplary embodiments of FIGS. 1-38 can include appropriate data structures for storing data collected and/or generated in one or more databases thereof. Such data structures, accordingly, can include fields for storing such collected and/or generated data. In a database management system, data can be stored in one or more data containers, each container including records, and the data within each record can be organized into one or more fields. In relational database systems, the data containers can be referred to as tables, the records can be referred to as rows, and the fields can be referred to as columns. In object-oriented databases, the data containers can be referred to as object classes, the records can be referred to as objects, and the fields can be referred to as attributes. Other database architectures can be employed and use other terminology. Systems that implement the exemplary embodiments of the present invention are not limited to any particular type of data container or database architecture.

All or a portion of the exemplary embodiments of FIGS. 1-38 can be conveniently implemented using one or more conventional general purpose computer systems, microprocessors, digital signal processors, micro-controllers, and the like, programmed according to the teachings of the embodiments of the present invention (e.g., using the computer system of FIG. 39), as can be appreciated by those skilled in the computer and software art(s). Appropriate software can be readily prepared by programmers of ordinary skill based on the teachings of the present disclosure, as can be appreciated by those skilled in the software art. Further, the exemplary embodiments of FIGS. 1-38 can be implemented on the World Wide Web (e.g., using the computer system of FIG. 39). In addition, the exemplary embodiments of FIGS. 1-38 can be implemented by the preparation of application-specific integrated circuits or by interconnecting an appropriate network of conventional component circuits, as can be appreciated by those skilled in the electrical art(s).

Figure 39:
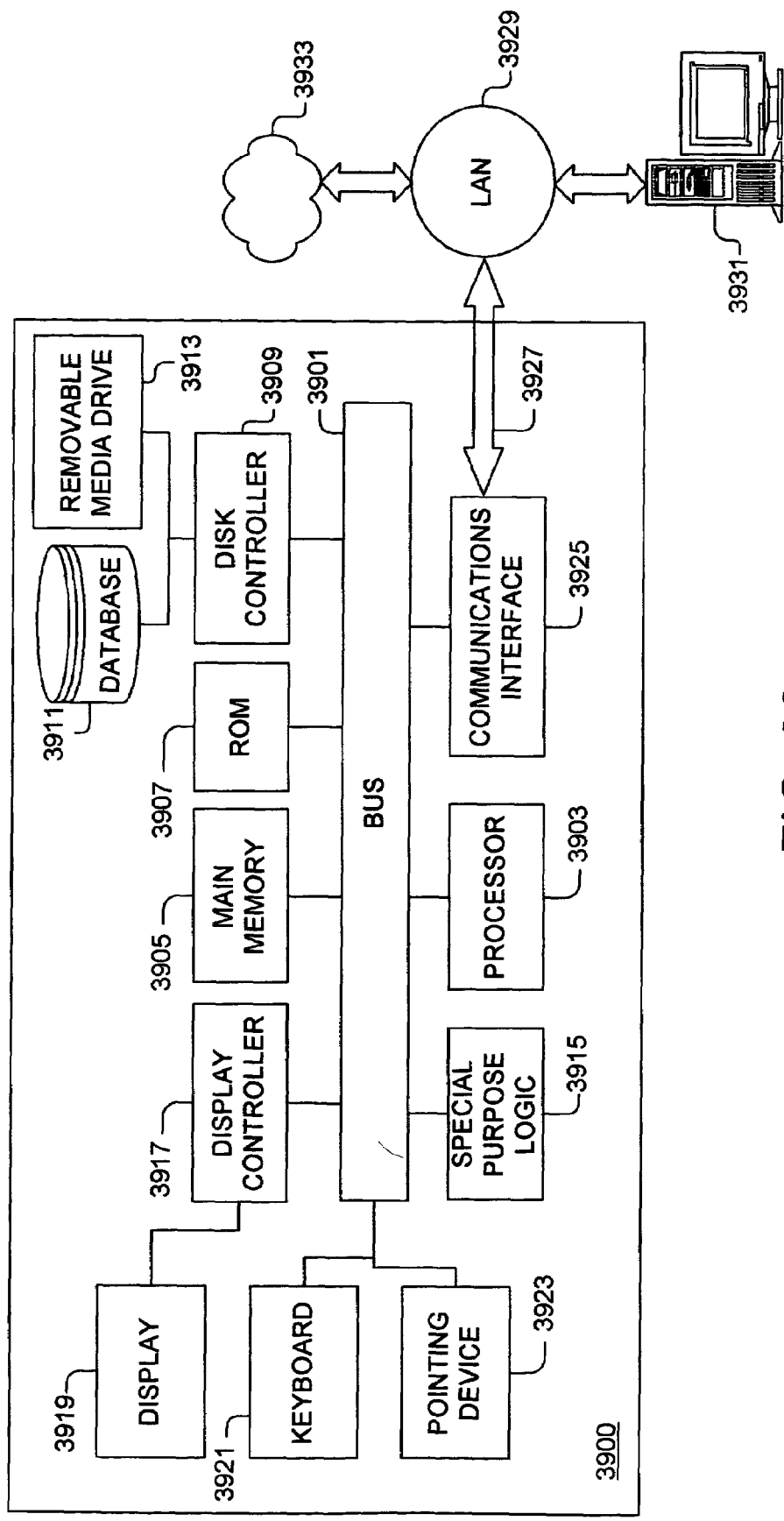
FIG. 39 illustrates an exemplary computer system, which can be programmed to perform one or more of the processes of the exemplary embodiments.

FIG. 39 illustrates a computer system 3900 upon which the exemplary embodiments (e.g., the devices and subsystems of the exemplary embodiments of FIGS. 1-38) can be implemented. The various embodiments can be implemented on a single such computer system, or a collection of multiple such computer systems. The computer system 3900 can include a bus 3901 or other communication mechanism for communicating information, and a processor 3903 coupled to the bus 3901 for processing the information. The computer system 3900 also can include a main memory 3905, such as a random access memory (RAM), other dynamic storage device (e.g., dynamic RAM (DRAM), static RAM (SRAM), synchronous DRAM (SDRAM)), etc., coupled to the bus 3901 for storing information and instructions to be executed by the processor 3903.

In addition, the main memory 3905 also can be used for storing temporary variables or other intermediate information during the execution of instructions by the processor 3903. The computer system 3900 further can include a ROM 3907 or other static storage device (e.g., programmable ROM (PROM), erasable PROM (EPROM), electrically erasable PROM (EEPROM), etc.) coupled to the bus 3901 for storing static information and instructions.

The computer system 3900 also can include a disk controller 3909 coupled to the bus 3901 to control one or more storage devices for storing information and instructions, such as a magnetic hard disk 3911, and a removable media drive 3913 (e.g., floppy disk drive, read-only compact disc drive, read/write compact disc drive, compact disc jukebox, tape drive, and removable magneto-optical drive). The storage devices can be added to the computer system 3900 using an appropriate device interface (e.g., small computer system interface (SCSI), integrated device electronics (IDE), enhanced-IDE (E-IDE), direct memory access (DMA), or ultra-DMA).

The computer system 3900 also can include special purpose logic devices 3915, such as application specific integrated circuits (ASICs), full custom chips, configurable logic devices, e.g., simple programmable logic devices (SPLDs), complex programmable logic devices (CPLDs), field programmable gate arrays (FPGAs), and the like, for performing special processing functions, such as signal processing, image processing, speech processing, voice recognition, communications functions, stub generation functions, driver generation functions, script generation functions, source code scanning functions, source code translation functions, scheduler functions, etc.

The computer system 3900 also can include a display controller 3917 coupled to the bus 3901 to control a display 3919, such as a cathode ray tube (CRT), liquid crystal display (LCD), active matrix display, plasma display, touch display, etc., for displaying or conveying information to a computer user. The computer system can include input devices, such as a keyboard 3921 including alphanumeric and other keys and a pointing device 3923, for interacting with a computer user and providing information to the processor 3903. The pointing device 3923 can include, for example, a mouse, a trackball, a pointing stick, etc. or voice recognition processor, etc., for communicating direction information and command selections to the processor 3903 and for controlling cursor movement on the display 3919. In addition, a printer can provide printed listings of the data structures/information of the exemplary embodiments of FIGS. 1-38 or any other data stored and/or generated by the computer system 3900.

The computer system 3900 can perform all or a portion of the processing steps of the invention in response to the processor 3903 executing one or more sequences of one or more instructions contained in a memory, such as the main memory 3905. Such instructions can be read into the main memory 3905 from another computer readable medium, such as the hard disk 3911 or the removable media drive 3913. Execution of the arrangement of instructions contained in the main memory 3905 causes the processor 3903 to perform the process steps described herein. One or more processors in a multi-processing arrangement also can be employed to execute the sequences of instructions contained in the main memory 3905. In alternative embodiments, hard-wired circuitry can be used in place of or in combination with software instructions. Thus, embodiments are not limited to any specific combination of hardware circuitry and/or software.

Stored on any one or on a combination of computer readable media, the embodiments of the present invention can include software for controlling the computer system 3900, for driving a device or devices for implementing the invention, and for enabling the computer system 3900 to interact with a human user (e.g., users of the exemplary embodiments of FIGS. 1-38, etc.). Such software can include, but is not limited to, device drivers, firmware, operating systems, development tools, applications software, etc. Such computer readable media further can include the computer program product of an embodiment of the present invention for performing all or a portion (if processing is distributed) of the processing performed in implementing the invention. Computer code devices of the embodiments of the present invention can include any interpretable or executable code mechanism, including but not limited to scripts, interpretable programs, dynamic link libraries (DLLs), Java classes and applets, complete executable programs, Common object Request Broker Architecture (CORBA) objects, etc. Moreover, parts of the processing of the embodiments of the present invention can be distributed for better performance, reliability, and/or cost.

The computer system 3900 also can include a communication interface 3925 coupled to the bus 3901. The communication interface 3925 can provide a two-way data communication coupling to a network link 3927 that is connected to, for example, a LAN 3929, or to another communications network 3933 (e.g., a wide area network (WAN), a global packet data communication network, such as the Internet, etc.). For example, the communication interface 3925 can include a digital subscriber line (DSL) card or modem, an integrated services digital network (ISDN) card, a cable modem, a telephone modem, etc., to provide a data communication connection to a corresponding type of telephone line. As another example, the communication interface 3925 can include a local area network (LAN) card (e.g., for Ethernet™, an Asynchronous Transfer Model (ATM) network, etc.), etc., to provide a data communication connection to a compatible LAN. Wireless links also can be implemented. In any such implementation, the communication interface 3925 can send and receive electrical, electromagnetic, or optical signals that carry digital data streams representing various types of information. Further, the communication interface 3925 can include peripheral interface devices, such as a Universal Serial Bus (USB) interface, a PCMCIA (Personal Computer Memory Card International Association) interface, etc.

The network link 3927 typically can provide data communication through one or more networks to other data devices. For example, the network link 3927 can provide a connection through the LAN 3929 to a host computer 3931, which has connectivity to the network 3933 or to data equipment operated by a service provider. The LAN 3929 and the network 3933 both can employ electrical, electromagnetic, or optical signals to convey information and instructions. The signals through the various networks and the signals on the network link 3927 and through the communication interface 3925, which communicate digital data with computer system 3900, are exemplary forms of carrier waves bearing the information and instructions.

The computer system 3900 can send messages and receive data, including program code, through the network 3929 and/or 3933, the network link 3927, and the communication interface 3925. In the Internet example, a server can transmit requested code belonging to an application program for implementing an embodiment of the present invention through the network 3933, the LAN 3929 and the communication interface 3925. The processor 3903 can execute the transmitted code while being received and/or store the code in the storage devices 3911 or 3913, or other non-volatile storage for later execution. In this manner, computer system 3900 can obtain application code in the form of a carrier wave. With the system of FIG. 39, the embodiments of the present invention can be implemented on the Internet as a Web Server 3900 performing one or more of the processes according to the embodiments of the present invention for one or more computers coupled to the Web server 3900 through the network 3933 coupled to the network link 3927.

The term computer readable medium as used herein can refer to any medium that participates in providing instructions to the processor 3903 for execution. Such a medium can take many forms, including but not limited to, non-volatile media, volatile media, transmission media, etc. Non-volatile media can include, for example, optical or magnetic disks, magneto-optical disks, etc., such as the hard disk 3911 or the removable media drive 3913. Volatile media can include dynamic memory, etc., such as the main memory 3905. Transmission media can include coaxial cables, copper wire and fiber optics, including the wires that make up the bus 3901. Transmission media also can take the form of acoustic, optical, or electromagnetic waves, such as those generated during radio frequency (RF) and infrared (IR) data communications.

As stated above, the computer system 3900 can include at least one computer readable medium or memory for holding instructions programmed according to the teachings of the invention and for containing data structures, tables, records, or other data described herein. Common forms of computer-readable media can include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media can be involved in providing instructions to a processor for execution. For example, the instructions for carrying out at least part of the embodiments of the present invention can initially be borne on a magnetic disk of a remote computer connected to either of the networks 3929 and 3933. In such a scenario, the remote computer can load the instructions into main memory and send the instructions, for example, over a telephone line using a modem. A modem of a local computer system can receive the data on the telephone line and use an infrared transmitter to convert the data to an infrared signal and transmit the infrared signal to a portable computing device, such as a PDA, a laptop, an Internet appliance, etc. An infrared detector on the portable computing device can receive the information and instructions borne by the infrared signal and place the data on a bus. The bus can convey the data to main memory, from which a processor retrieves and executes the instructions. The instructions received by main memory can optionally be stored on storage device either before or after execution by processor.

The exemplary embodiments can address problems discovered with respect to current test methodologies, such as test development being dependent on each individual designer or tester, current test methodologies requiring large amount of inefficient, redundant, and prerequisite effort, code analysis, variable searches, stub generation, driver creation, and the like. The exemplary embodiments further can address problems discovered with respect to current test methodologies, such as project specific requirements causing deviations from standard processes, test requirements differing per customer or project, test result documentation being dependent on a project or tool, regression test maintenance being difficult to maintain, and the like.

The exemplary embodiments can be configured to support prime software testing, for example, in C, Ada, FORTRAN, and the like, and can include an object-based architecture, and the like. The exemplary embodiments can be easily enhanced and maintained due to the flexible design, can support multiple prime software languages, can be easily installed on a PC or work station, can be configured for a Windows (95, 98, 2000, XP, NT, etc.), Macintosh, UNIX, Linux, and the like, operating systems, typically without being dependent on supporting software applications. The exemplary embodiments can be employed to test prime software on multiple platforms (e.g., PC, UNIX, etc.), and the like. The exemplary embodiments can creates test files including possible testing paths by looking for various keywords, for example, such as if, and, or, then, elsif, else, end if, case, when, for, while, loop, exit, xor, and the like.

Advantageously, the exemplary embodiments can provide standardized and automated test driver generation, automated stub generation, configurable script files for supporting efficient regression testing, ease of use via a full featured GUI, prime software language independence, testing of prime software on multiple platforms, supporting of requirements verification traceability, compatibility with configuration management tools, standardizing of output documentation, complete result files generation for providing evidence for verification (e.g., DO178B), software testing and development cost reductions, and the like.

Although the exemplary embodiments are described in terms of employing, for example, Windows and UNIX-based operating systems, and the like, and testing source code written in, for example, Ada, C, FORTRAN, and the like, the exemplary embodiments can be used with other operating systems and can be used to test other source codes, with appropriate configuration of, for example, the code scanners, the driver script generators, the translators, and the like, of the exemplary embodiments, as will be appreciated by those skilled in the software art(s).

While the present invention have been described in connection with a number of exemplary embodiments and implementations, the present invention is not so limited but rather covers various modifications and equivalent arrangements, which fall within the purview of the appended claims.

What is claimed is:

1. A computer-implemented method for software testing, comprising: analyzing the source code under test to generate a map of the source code under test or a tree structure for the source code under test; and to generate a scan file of all or a portion of the map or tree structure of the source code under test; generating a stub file for all or a portion of the map or tree structure based on the map or tree structure of the source code under test; generating a driver test script file for all or a portion of the map or tree structure of the source code under test based on the scan file and the stub file; generating a test driver for all or a portion of the map or tree structure of the source code under test based on the driver test script file; and running the test driver on all or a portion of the map or tree structure of the source code under test to generate a results file for summarizing the results of the software testing.

2. The method of claim 1, wherein said analyzing step is automatically performed by a code scanner configurable by a graphical user interface.

3. The method of claim 1, wherein the step of generating the stub file is automatically performed by a stub generator configurable by a graphical user interface.

4. The method of claim 1, wherein the step of generating the driver test script file is automatically performed by a driver script generator configurable by a graphical user interface.

5. The method of claim 1, wherein the step of generating the test driver is automatically performed in a driver build directory configurable by a graphical user interface.

6. The method of claim 1, further comprising displaying the results file with a graphical user interface.

7. The method of claim 1, wherein the map includes a list of executable source code names, package names, and procedure or function names for the package names.

8. The method of claim 7, further comprising generating the list of executable source code names for the stub file and the source code under test.

9. The method of claim 7, further comprising generating the tree structure by performing calls until the procedures or function for each of the packages are determined.

10. The method of claim 1, further comprising providing a graphical user interface for performing the analyzing step, the step of generating the stub file, the step of generating the driver test script file, the step of generating the test driver, and the running step.

11. The method of claim 10, further comprising employing the graphical user interface for specifying variable and variable type definitions.

12. The method of claim 10, further comprising employing the graphical user interface for documenting the software testing.

13. The method of claim 10, further comprising providing a FTP capability via the graphical user interface.

14. The method of claim 10, further comprising providing multi-language support for the source code under test via the graphical user interface.

15. The method of claim 10, further comprising providing mixed-language software testing via the graphical user interface.

16. The method of claim 10, further comprising displaying the scan file, the source code under test, the driver test script file, the test driver, and the results file, via the graphical user interface.

17. The method of claim 1, further comprising implementing the method via object-oriented programming.

18. The system of claim 1, wherein said analyzing means is automatically activated by a graphical user interface.

19. A system comprising a processor for software testing, comprising: means for analyzing the source code under test to generate a map of the source code under test or a tree structure for the source code under test; and to generate a scan file of all or a portion of the map or tree structure of the source code under test; means for generating a stub file for all or a portion of the map or tree structure based on the map or tree structure of the source code under test; means for generating a driver test script file for all or a portion of the map or tree structure of the source code under test based on the scan file and the stub file; means for generating a test driver for all or a portion of the map or tree structure of the source code under test based on the driver test script file; and means for running the test driver on all or a portion of the map or tree structure the source code under test to generate a results file for summarizing the results of the software testing.

20. The system of claim 19, wherein the means for generating the stub file is automatically activated by a graphical user interface.

21. The system of claim 19, wherein the means for generating the driver test script file is automatically activated by a graphical user interface.

22. The system of claim 19, wherein the means for generating the test driver is automatically activated by a graphical user interface.

23. The system of claim 19, further comprising means for displaying the results file.

24. The system of claim 19, wherein the map includes a list of executable source code names, package names, and procedure or function names for the package names.

25. The system of claim 24, further comprising means for generating the list of executable source code names for the stub file and the source code under test.

26. The system of claim 24, further comprising means for generating the tree structure by performing calls until the procedures or function for each of the packages are determined.

27. The system of claim 19, further comprising means providing a user interface for accessing the analyzing means, the means for generating the stub file, the means for generating the driver test script file, and the means for generating the test driver, and the running means.

28. The system of claim 27, further comprising means for employing the user interface for specifying variable and variable type definitions.

29. The system of claim 27, further comprising means for employing the user interface for documenting the software testing.

30. The system of claim 27, further comprising means for providing a FTP capability via the user interface.

31. The system of claim 27, further comprising means for providing multi-language support for the source code under test via the user interface.

32. The system of claim 27, further comprising means for providing mixed-language software testing via the user interface.

33. The system of claim 27, further comprising means for displaying the scan file, the source code under test, the driver test script file, the test driver, and the results file, via the user interface.

34. The system of claim 27, wherein the user interface includes a graphical user interface.

35. The system of claim 19, further comprising means for implementing the system via object-oriented programming.

36. The system of claim 19, wherein the means for analyzing, the means for generating the stub file, the means for generating the driver test script file, the means for generating the test driver, and the means for running the test driver comprise devices of a computer system.

37. The system of claim 19, wherein the means for analyzing, the means for generating the stub file, the means for generating the driver test script file, the means for generating the test driver, and the means for running the test driver comprise computer-readable instructions stored on a tangible computer storage medium.

* * * * *